US006325333B1

(12) United States Patent
Najmabadi et al.

(10) Patent No.: US 6,325,333 B1
(45) Date of Patent: Dec. 4, 2001

(54) AIRCRAFT PITCH-AXIS STABILITY AND COMMAND AUGMENTATION SYSTEM

(75) Inventors: Kioumars Najmabadi, Bellevue; Monte R. Evans, Federal Way; Edward E. Coleman, Lake Forest Park; Robert J. Bleeg, Mercer Island; Richard S. Breuhaus, Issaquah; Dorr Marshall Anderson, Seattle; Timothy A. Nelson, Kirkland, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/619,798

(22) Filed: Jul. 20, 2000

Related U.S. Application Data

(62) Division of application No. 09/390,183, filed on Sep. 7, 1999, now Pat. No. 6,158,695, which is a continuation of application No. 08/963,926, filed on Nov. 4, 1997, now Pat. No. 5,979,835, which is a division of application No. 08/441,281, filed on May 15, 1995, now Pat. No. 5,722,620.

(51) Int. Cl.$^7$ .................................................. B64C 13/18

(52) U.S. Cl. ........................ 244/181; 244/227; 701/6

(58) Field of Search ................................ 244/178, 194, 244/181, 223, 227; 318/618, 632; 701/4–6

(56) References Cited

U.S. PATENT DOCUMENTS

| | | |
|---|---|---|
| 3,345,018 | 10/1967 | Chanak et al. . |
| 3,911,345 | 10/1975 | Totten . |
| 4,198,017 * | 4/1980 | Murray .................................. 244/178 |
| 4,261,537 | 4/1981 | Tisdale et al. . |
| 4,422,180 * | 12/1983 | Wendt .................................... 244/194 |
| 4,477,043 * | 10/1984 | Repperger ............................ 244/223 |
| 4,607,201 * | 8/1986 | Koenig ................................. 244/181 |

(List continued on next page.)

OTHER PUBLICATIONS

"A320 Fly By Wire and Handling Qualities", 5$^{th}$ Performance and Operations Conference, *Airbus Industrie Engineering Directorate Flight Division*, May 1988, 13 pages.

*A320 Primary Flight Control Flight Crew Operating Manual Description*, date unknown, 6 pages.

Mooij, H.A., et al., "Flight Test of Stick Force Stability in Attitude–Stabilized Aircraft", vol. 15, No. 9, pp. 562–566, Sep. 1978, 5 pages.

Hughes, D., "Extensive MD–11 Automation Assists Pilots, Cuts Workload", *Aviation Week & Space Technology*, Oct. 22, 1990, 9 pages.

(List continued on next page.)

*Primary Examiner*—Galen L. Barefoot
(74) *Attorney, Agent, or Firm*—Christensen O'Connor Johnson and Kindness PLLC

(57) ABSTRACT

A bias correction system for use in a neutrally-stable aircraft having a control column and a pitch control system is provided. The position of the control column is generally represented by a control column position signal. The bias correction system is for removing control column bias when the control column is in a neutral position. The bias correction system includes a first combining unit for combining the control column position signal and a correction signal, and a switch. The switch includes activated and deactivated states. The switch is set to the deactivated state when the control column is physically displaced from its neutral position. The deactivated state allows the correction signal to remain at its last value, the activated state allows the correction signal to equal approximately the control column position signal. In one embodiment, the bias correction system includes a smoothing filter for receiving the control column position signal and outputting a smoothed correction signal when the switch is in the activated state. In another embodiment, the bias correction system includes a unit for limiting the correction signal to control column position signal values within a limited predefined range.

9 Claims, 16 Drawing Sheets

U.S. PATENT DOCUMENTS

| | | |
|---|---|---|
| 4,676,460 | 6/1987 | Hagy et al. . |
| 4,762,294 * | 8/1988 | Carl ........................................ 244/227 |
| 4,767,085 | 8/1988 | Boudreau et al. . |
| 4,825,375 * | 4/1989 | Nadkarni et al. ..................... 244/181 |
| 4,849,900 | 7/1989 | Blight et al. . |
| 4,855,738 | 8/1989 | Greene . |
| 4,956,780 * | 9/1990 | Sankrithi et al. ..................... 244/181 |
| 5,016,177 | 5/1991 | Lambregts . |
| 5,020,747 | 6/1991 | Orgun et al. . |
| 5,136,518 | 8/1992 | Glover . |
| 5,225,829 | 7/1993 | Bateman . |
| 5,347,204 * | 9/1994 | Gregory et al. ...................... 244/223 |
| 5,590,853 | 1/1997 | Greene . |
| 5,695,157 | 12/1997 | Coirier et al. . |
| 5,803,408 | 9/1998 | Gast . |
| 5,823,479 | 10/1998 | Nield et al. . |
| 5,836,546 | 11/1998 | Gast . |

OTHER PUBLICATIONS

Airbus Industrie, "The New Generation", Brochure, Ref. No. AI/EV–T 474.0338 BS, Issue 2, Dec. 1992, 60 pages.

Airbus Industrie, "Fly by Wire A300 Aircraft 3 Demonstration", Ref. No. AI/EC, No. 048/86, Jun., 1986, 25 pages.

Corps, S.G., "Airbus A320 Side Stick and Fly By Wire—An Update", *SAE Technical Paper Series*, Aerospace Technology Conference and Exposition, No. 86801, Oct. 1986, 13 pages.

Wagner, G.A., "What Makes the A320 Different?", *Pilot*, pp. 24–32, Oct. 1988, 9 pages.

Tobie, H.N, et al. "A New Longitudinal Handling Qualities Criterion", The Boeing Company, date unknown, 7 pages.

Droste, C.S. et al., "The General Dynamics Case Study on the F–16 Fly–By–Wire Flight Control System", *AAIA Professional Study Series*, date unknown, 3 pages.

Blight et al., "Control Law Synthesis for an Airplane with Relaxed Static Stability", *Journal of Guidance, Control and Dynamics*, vol. 9, No. 5, Sep.–Oct. 1986, pp. 546–554.

* cited by examiner

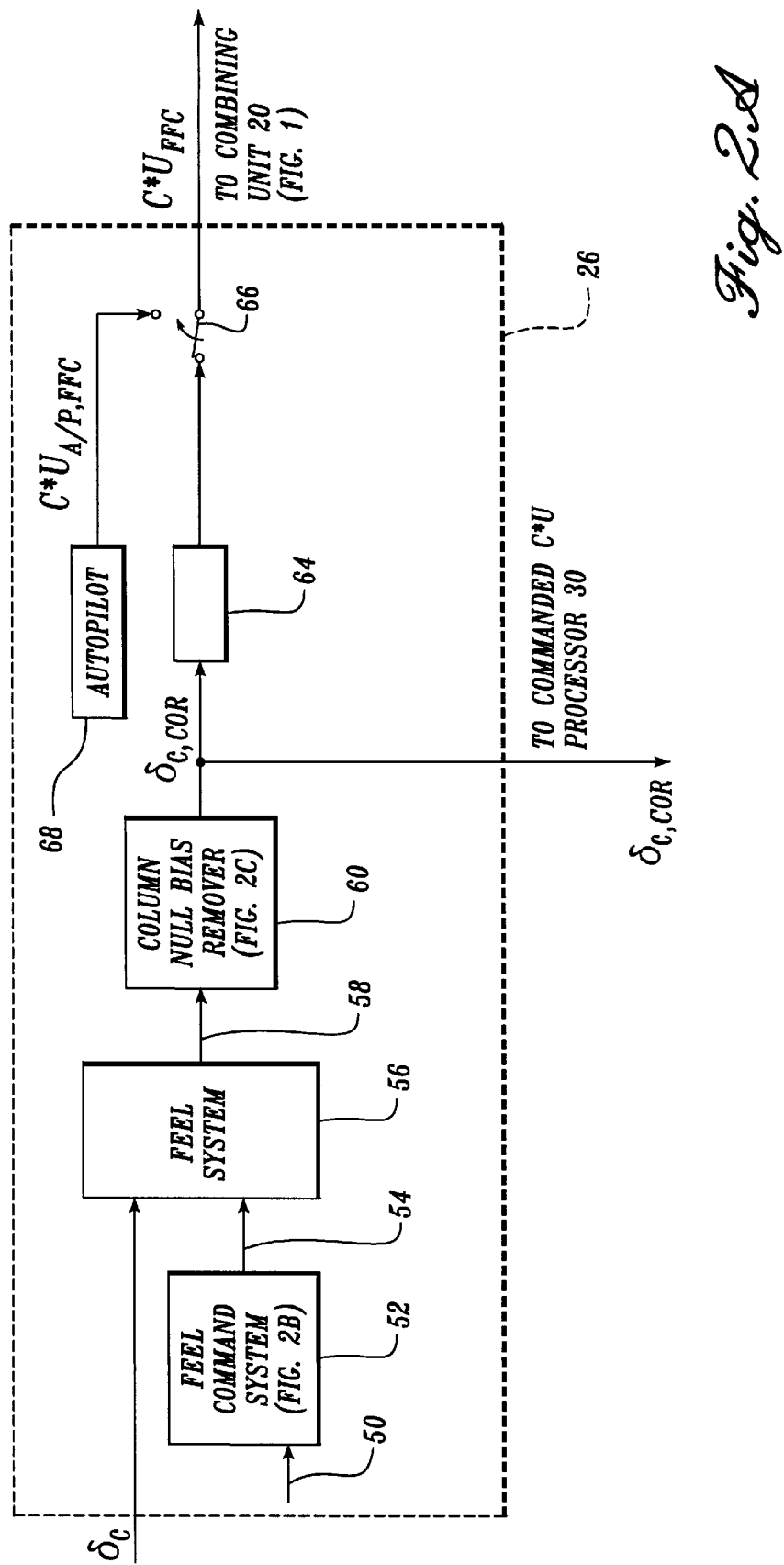

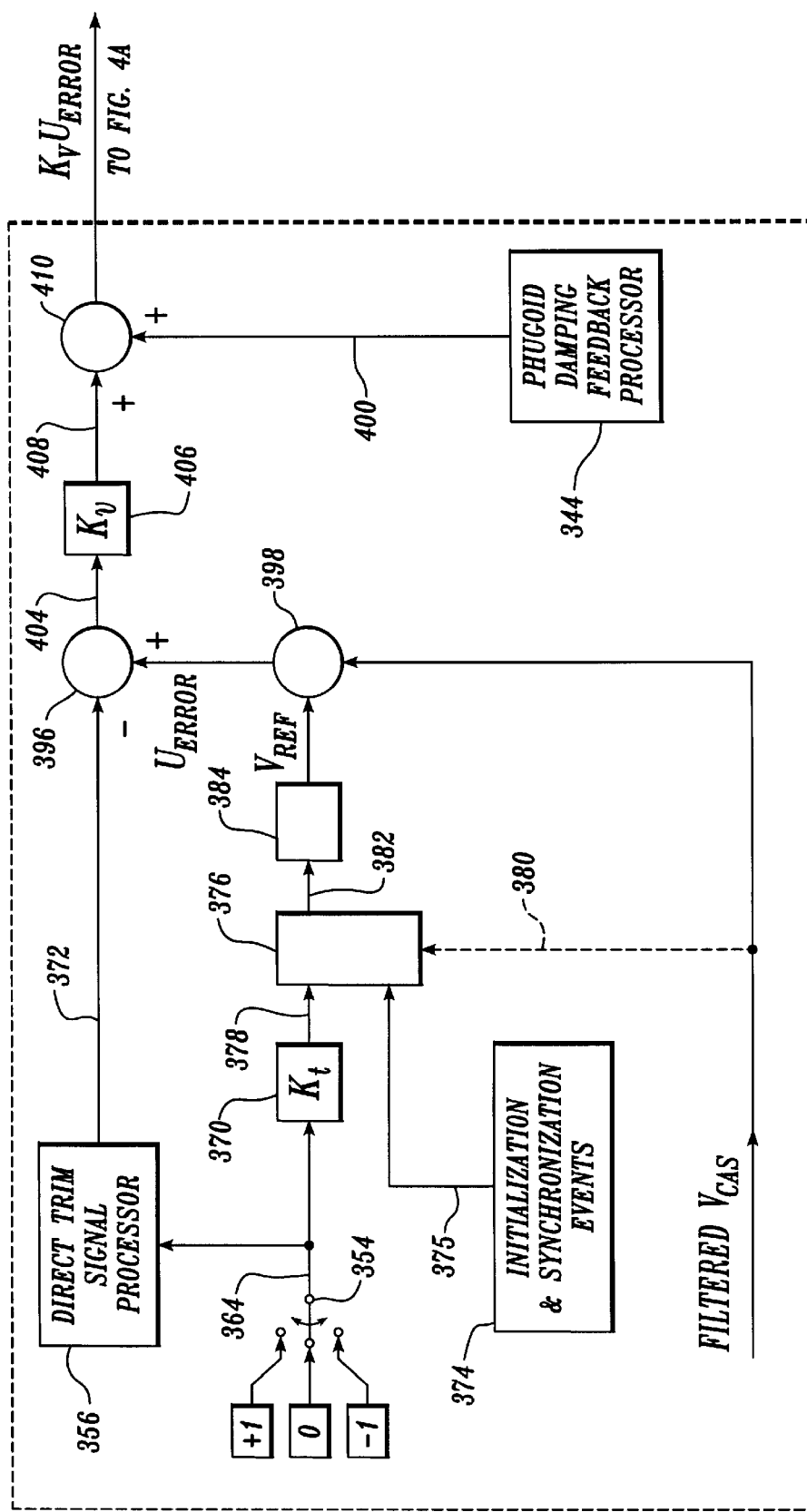

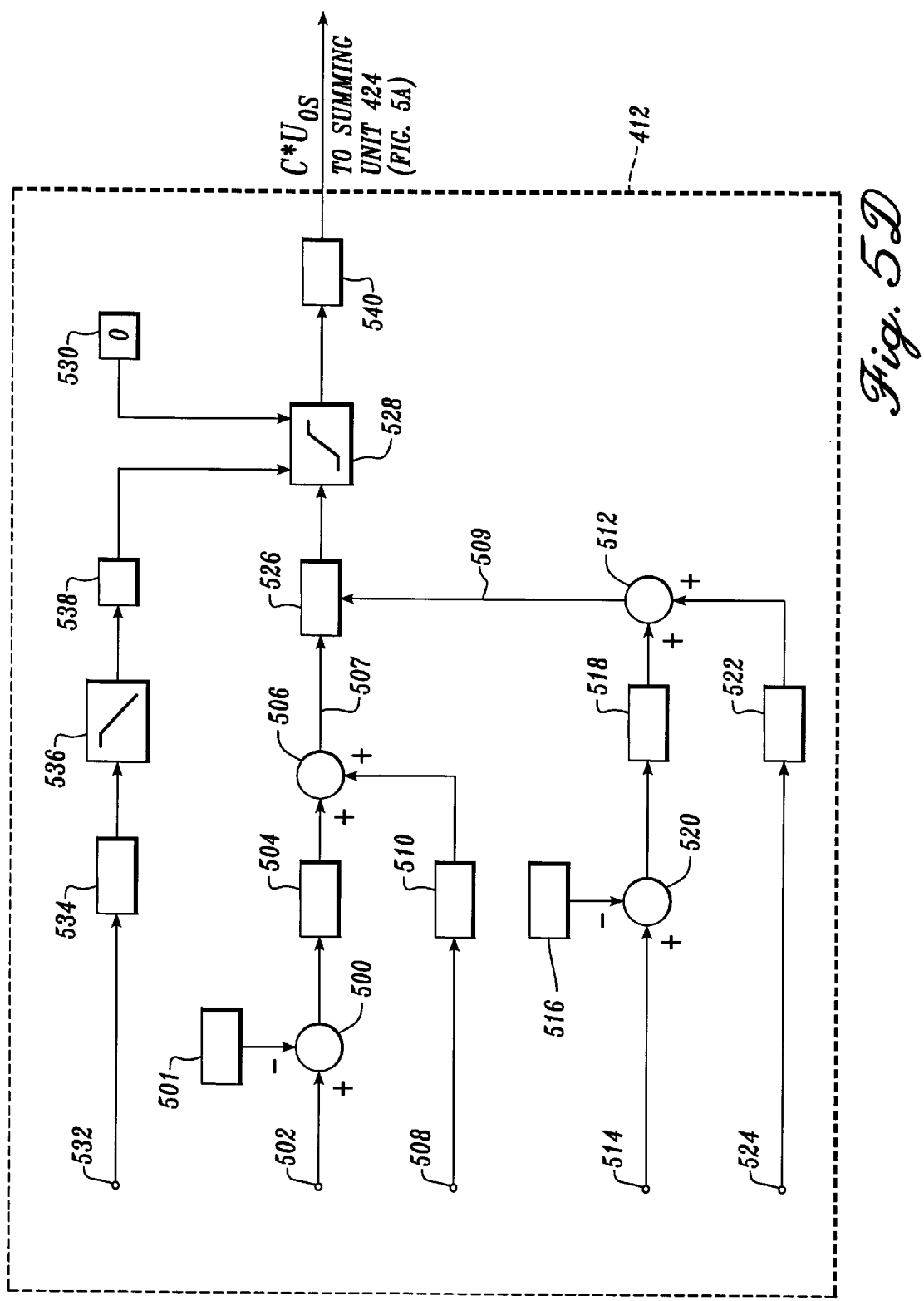

AIRCRAFT PITCH-AXIS STABILITY AND COMMAND AUGMENTATION SYSTEM

RELATED APPLICATIONS

This is a divisional of prior application Ser. No. 09/390,183, filed Sep. 7, 1999 now U.S. Pat. No. 6,158,695; which is a continuation of prior application Ser. No. 08/963,926, filed Nov. 4, 1997, issued as U.S. Pat. No. 5,979,835 on Nov. 9, 1999; which is a divisional of prior application Ser. No. 08/441,281, filed May 15, 1995, issued Mar. 3, 1998 as U.S. Pat. No. 5,722,620, the benefit of the filing data of which is hereby claimed under 35 U.S.C. § 120.

FIELD OF THE INVENTION

This invention relates generally to flight control systems for aircraft, and more particularly, to an apparatus and method for controlling aircraft elevator commands using a pitch-axis stability and command augmentation system.

BACKGROUND OF THE INVENTION

On some new airplanes, the static stability of the plane has been purposefully relaxed to include instances of flight wherein the plane has neutral static stability. A significant benefit in fuel-efficiency, weight-savings, and drag-reduction can be realized with such a system, due to an allowable reduction in required tail size. An airplane with relaxed static stability may have some undesirable and unacceptable handling quality characteristics, though.

One characteristic is that a neutrally stable airplane will not naturally return to its previous airspeed after a change in pitch attitude. On a trimmed positive static stability airplane, the pitch attitude changes according to the pilot pushing forward or pulling back on the control column. When the column is released, the airplane will continue to fly at its new pitch for a short time. As the airspeed of the plane changes, the airplane will have a natural tendency to nose up or nose down, returning to its previous trim speed. This tendency is an expected handling quality of conventional commercial aircraft, and one to which pilots virtually automatically respond in flying their craft.

Neutrally stable planes have no tendency to return to their trim position and airspeed after an adjustment of pitch. For these aircraft, changes in pitch are maintained and airspeed varies accordingly. During pitch increases, airspeed decreases. During pitch decreases, airspeed increases. To return the aircraft to its trim position and speed, the pilot must return the plane to its trim pitch, by repositioning the elevators with the control column.

A characteristic that is common to planes with or without relaxed static stability is that the amount of elevator input required to accomplish a certain pitch is sensitive to changes in weight and location of center of gravity relative to the mean aerodynamic center. An aircraft that is light in weight and has a center of gravity near the mean aerodynamic center, requires only a small change in elevator angle of attack to produce a large change in airplane pitch. Conversely, a heavy aircraft having a forward center of gravity requires much more elevator deflection to produce a like change in airplane pitch. Without control augmentation, the pilot must move the control column much farther in the heavy case in order to get the same pitch response as in the light case. This can be an undesirable characteristic because it requires the pilot to adjust his or her column input based on the weight and location of the plane's center of gravity—pieces of information not readily perceptible.

A third characteristic, though not related to relaxed stability aircraft, concerns the manner in which pilots expect the airplane to respond when the control column is moved. It is fairly well known that at low airspeeds, pilots expect movement of the control column to produce a change in pitch rate. At high airspeeds, pilots expect movement of the control column to produce a change in normal acceleration. This situation was recognized in the 1960's and the C* criterion was developed as a way to express optimal airplane response taking it into consideration. The C* criterion is discussed in detail below.

Thus, there exists a need for a superior pitch attitude control system capable of improving the control and handling characteristics of an aircraft. Optimally, this pitch attitude control system should provide such an airplane with handling characteristics (from the pilot's point of view) similar to an ideal conventional airplane with positive static stability, in order to reduce the amount of variation in flying technique required. The ideal control system should accomplish this goal by meeting the pilot's expectation regarding the airplane's short and long term responses to elevator command; and by responding to pilot pitch commands in a similar manner, regardless of weight or center of gravity shifts. The ideal control system should further accommodate the pilot's expectations to control pitch rate during low airspeed maneuvers and control to normal acceleration during high airspeed maneuvers. As will be appreciated by a reading of the following description, the present invention is directed to providing such a superior pitch attitude control system.

SUMMARY OF THE INVENTION

The present invention provides a pitch-axis stability and command system for augmenting aircraft elevator commands. The present invention uses a criterion herein referred to as the C*U criterion to provide ideal pitch response airplane characteristics and long-term speed stability in the pitch axis. The C*U criterion allows the present invention to accomplish the previously mentioned goals by optimizing the pitch rate and normal acceleration response of the airplane and by providing the desirable speed stability characteristics of a conventional airplane.

The present invention uses a feedback system configured to receive a control column input and convert the input into elevator command signals. The feedback portion of the system processes signal representative of current airplane data which is formed in response to a previous elevator command. Augmentation of the system is accomplished by converting the column input into a pilot-requested C*U command signal and comparing that command signal with a computed C*U command signal generated on the basis of the current airplane state. The error signal, which represents the difference between what the pilot is commanding and how the aircraft is responding, is integrated and the result is added to the elevator command signal. Therefore, the pitch-axis stability and command augmentation system of the present invention zeros any difference between what the pilot has requested and what the airplane is performing.

In accordance with the present invention, the pitch-axis stability and command augmentation system includes a pitch command processor that converts a pilot column input into a feedforward command signal that is one of two signals used to generate an elevator pitch command. The second signal component is discussed below. The command processor additionally supplies a corrected column position signal to a commanded C*U processor that converts the corrected column position into a C*U pitch command signal representative of the movement of the control column that requests pitch change.

In accordance with further aspects of the present invention, a computed C*U processor forms a computed C*U signal that is based on the current state of the aircraft. The computed C*U signal of the currently preferred embodiments includes at least three components: a normal acceleration signal, a pitch rate signal, and a speed error signal. In the preferred embodiment, the normal acceleration and pitch rate signals are earth-referenced and are supplied by a normal acceleration complementary filter and a pitch rate complementary filter, respectively.

The speed error signal is supplied by a speed stability processor. The speed stability processor includes phugoid damping in its formation of the speed error signal. The speed stability processor further implements a method that allows the pilot to set a reference airspeed by using a trim device.

In accordance with other aspects of the present invention, three C*U compensation and protection signals are supplied to further enhance the handling and response characteristics of the airplane. An underspeed protection signal is supplied by a stall protection processor which includes the additional features of establishing a minimum reference airspeed below which the pilot may not trim and enhances the airplane response and handling characteristics during underspeed operation. A flare compensation signal is supplied by a flare compensation processor to cause the aircraft to perform as if encountering ground effects during landing. An overspeed protection processor supplies an overspeed protection signal to command the elevator to nose-up whenever the aircraft is being operated at all overspeed condition. A combining unit is provided to combine the signals of stall protection, flare compensation, and overspeed protection.to form a C*U compensation and protection signal. The underspeed and overspeed protection signal can be overridden by the pilot by moving the control column to supply counteracting pitch signals. Thus, by conscious choice, the airplane can remain at underspeed or overspeed condition. In addition, a configuration compensation feature can be included to reduce pilot workload during configuration change.

In accordance with yet other aspects of the invention, another combining unit is provided to combine the subtractive input of pilot-requested C*U command signal, the additive input of the computed C*U signal, and the subtractive input of C*U compensation and protection signal. The resulting error signal is supplied to an integrator that outputs an integrated error signal. Another combining unit receives the integrated error signal as an additive input and sums it with a signal representative of pitch rate damping command. The pitch rate damping command signal is provided to damp short period response and adjust the short period frequency. The output of the combining unit is an additive input to the combining unit having another additive input of feedforward command. The resulting signal is the C*U augmented elevator command signal.

In accordance with still further aspects of the present invention, structural mode filters are provided to remove the frequency content of the elevator command signal. A stabilizer off-load function is provided to adjust the stabilizer such that elevator authority is available throughout the flight.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2a is a control diagram of a pitch command processor of FIG. 1;

FIG. 2b is a control diagram of a feel command system of FIG. 2a;

FIG. 2c is a control diagram of column null bias remover of FIG. 2a;

FIG. 4e is a control diagram of a speed stability processor of FIG. 4a;

FIG. 5b is a control diagram of a stall protection processor of FIG. 5a;

FIG. 5c is a control diagram of a flare compensation processor of FIG. 5a;

FIG. 5d is a control diagram of an overspeed protection processor of FIG. 5a;

DETAILED DESCRIPTION OF THE PREFERRED EMBODIMENT

Figure 1:
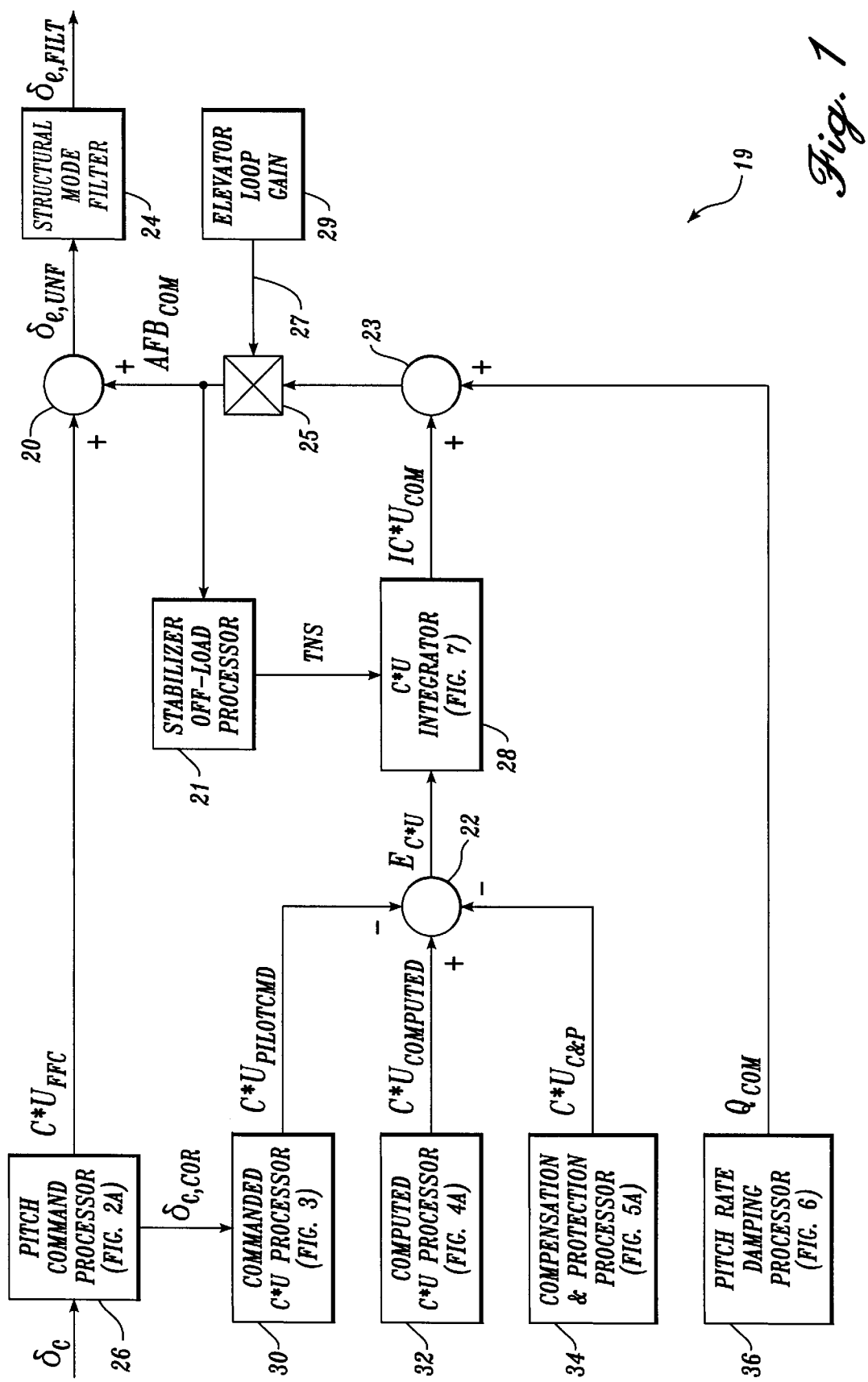
FIG. 1 is a control diagram of an overall pitch-axis stability and command augmentation system formed according to the teachings of the present invention.

The present invention is directed to providing a pitch-axis stability aid command system that provides desirable control surface responses for any aircraft, including relaxed stability planes, and that has desirable handling characteristics for pilots in flying the aircraft. The present invention accomplishes these goals by incorporating a new concept called the C*U (pronounced "C star U") criterion. The C*U criterion defined herein is based on the C* criterion developed in the mid-1960's and described briefly below.

C* Criterion Generally

Prior to the mid-1960's, the handling characteristics of a plane for any particular longitudinal maneuver were generally assessed by comparing the plane's pitch rate response produced by a control column input, with a pilot-derived definition of acceptable pitch rate responses. If the response was within a certain envelope, it was deemed acceptable. This type of analysis was done to assess airplane performance at both high and low speeds. It was established that at high speeds, however, the most significant motion cue to pilots was the normal acceleration of the plane. Because of this, it was desirable to find a way to express acceptable airplane performance that considered pitch rate and normal acceleration response, as well.

During the 1960's, the method of C* analysis was developed as a way to assess the total longitudinal airplane response and handling characteristics that considered the primary pilot motion cues for both low and high speeds. C* is a measure for short period ride handling quality. The C* variable is defined as a blend of pitch rate and normal acceleration.

$$C^* = N_z + K_q q \quad (1)$$

where $N_z$ is body normal acceleration, $K_q$ is blending gain, and q is body pitch rate.

The C* variable was formed as an index to assess the goodness of longitudinal dynamic response characteristics of an airplane. The pitch rate and normal acceleration were selected because they are the most significant motion cues to pilots at low and high speed respectively. In using the C* criterion, an analyst would compare the value of C* as calculated for any particular high or low speed longitudinal maneuver, with a pilot-derived definition of acceptable C* values. If the response was within this envelope, it was thought to have acceptable handling characteristics.

Since the development of the C* criterion, a few commercial and military airplanes have used of C* criterion as a basis in their longitudinal control systems. A control system based solely on the C* concept converts the pilot command to a C* command. Therefore, at low airspeeds, the pilot command is viewed as a request for a different pitch rate, and at high airspeeds, the pilot command is viewed as a request for a different normal acceleration. A control system based solely on a C* variable provides neutral speed stability characteristics to an airplane (i.e., if airplane speed changes, there would be no tendency for the airplane to return to its trim speed). Neutral speed stability is a characteristic that is present in many previous airplanes. While pilot workload is reduced in an airplane with neutral speed stability, the pilot's awareness of airplane airspeed based on column force has diminished.

The present invention utilizes a new variable, C*U, which is defined to be a combination of the C* criterion described above and a speed stability term, hence the name C*U (U referring to speed stability). The C*U variable may be determined as follows:

$$C^*U \equiv C^* - K_V U_{ERROR} \quad (2)$$

where C* is defined as in equation (1), $K_V$ is the speed stability gain, and $U_{ERROR}$ is the error between the airplane longitudinal speed and the C*U reference speed. $U_{ERROR}$ is defined as:

$$U_{ERROR} \equiv V_{CAS} - V_{REF} \quad (3)$$

where $V_{CAS}$ is the airplane calibrated airspeed and $V_{REF}$ is a reference speed. Related $U_{ERROR}$ may be computed from equivalent airspeed, true airspeed, indicated airspeed, and/or Mach, in which cases the numerical values for $K_V$ will be different from that described herein.

In simplified terms, the control law of the present invention accepts a column input and generates a feedforward C*U elevator command. In addition, a pilot-inputted C*U command is calculated according to the desired airplane response. A computed C*U signal is calculated according to the terms of equation (2), based on the current dynamics of the plane. The computed C*U signal is compared with the pilot-inputted command and an error signal is formed. This term is integrated and combined with the feedforward C*U elevator command and the pitch rate damping command to form the output of an elevator pitch command. This is explained in detail in section 1 below.

As will be better understood from the following description, while the invention was designed for use in a relaxed stability airplane control system, and is described in connection with such a system, it is to be understood the invention can be incorporated in other types of airplane control systems, if desired. Further, as is conventional, while the invention is illustrated and described in the form of a control law containing discrete blocks designed to accomplish specific functions, it is to be understood that the invention can be actually implemented in various ways. For example, the various functions of the illustrated control law can be carried out by a suitably programmed digital computer system. Alternatively, the functions can be carried out by digital or analog circuits.

The following detailed description is divided into seven sections. The first section discusses the overall augmented pitch control system and its major components. The remaining sections detail each of those major components.

1. Discussion of Pitch-Axis Stability and Command Augmentation System

Shown in FIG. 1 is a control diagram of a pitch-axis stability and command augmentation system 19 formed according to the teachings of the present invention. The output of the pitch-axis stability and command augmentation system 19 is an elevator command $\delta_{e,FILT}$, which is eventually sent to an elevator servo-mechanism instructing it to adjust the elevator. FIG. 1 is a simplified diagram and therefore does not include all inputs. The remaining figures show further information.

Prior to being sent from the pitch-axis stability and command augmentation system 19, the elevator command signal $\delta_{e,FILT}$ is preferably filteired by a structural mode filter 24 whose input is an unfiltered elevator command signal $\delta_{e,UNF}$ formed by a first combining unit 20. The structural mode filter 24 attempts to remove the frequency content of the unfiltered elevator command signal $\delta_{e,UNF}$ that could interfere with the structural modes of the aircraft. This is done to avoid undesirable and/or unstable flight characteristics and to avoid causing the aircraft to vibrate or resonate during certain control maneuvers. The preferred structural mode filter 24 depends on the airplane's particular structural frequencies. There are a wide variety of ways that this filter may be included in the command system 19. It may be located elsewhere in the command system 19 or may be separated into parts and located in various positions.

The first combining unit 20 combines a C*U feedforward command $C^*U_{FFC}$ with an augmented feedback command AFBCOM. The feedforward command $C^*U_{FFC}$ is based on a pilot column input signal $\delta_C$ as modified by a C*U pitch command processor 26. The C*U feedforward command $C^*U_{FFC}$ is preferably related to the motion of the control column, but the present invention encompasses using a commanded elevator position input from an autopilot or other controlling source instead of a pilot column input $\delta_C$.

Figure 2B:
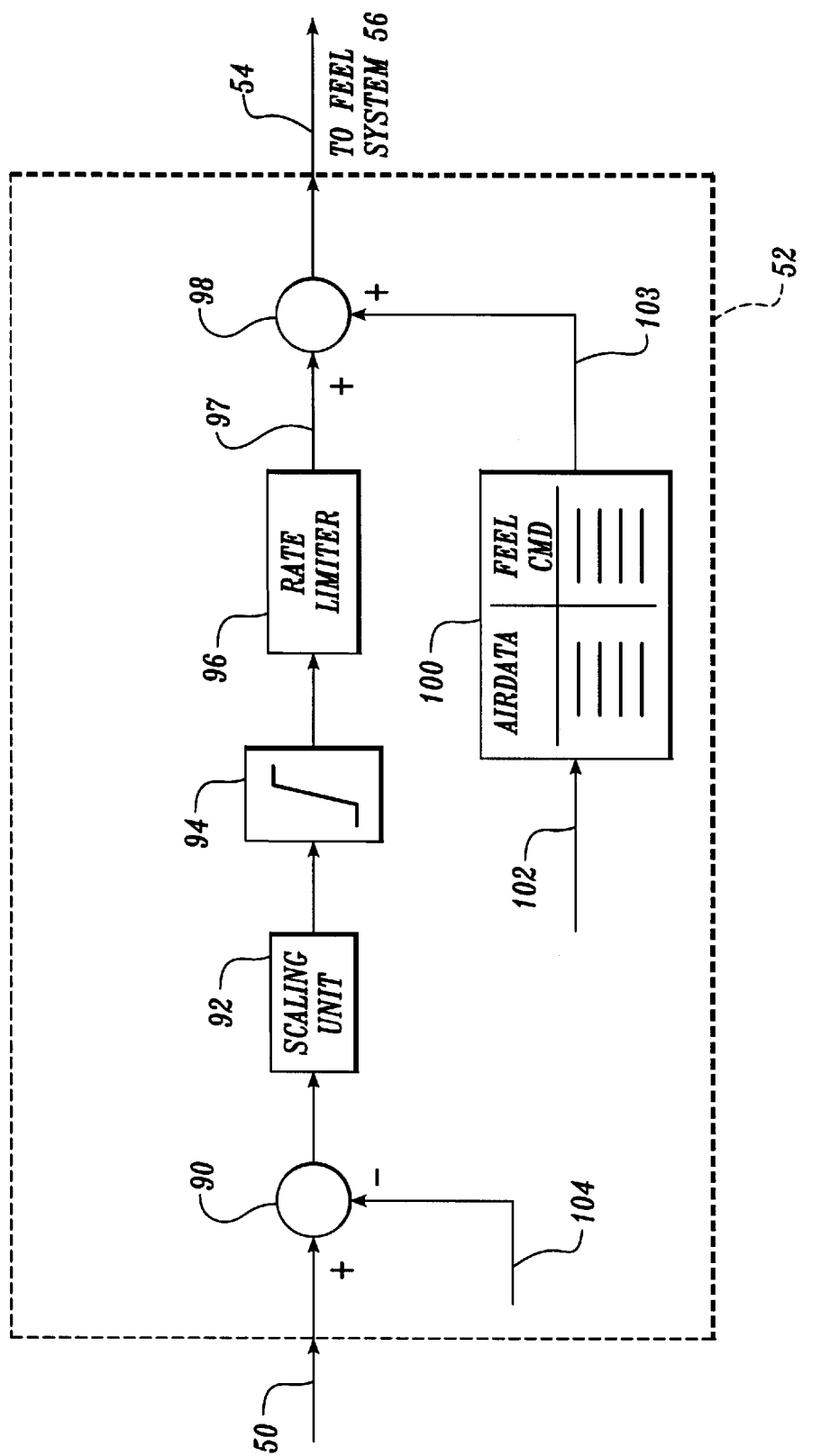
Figure 2C:
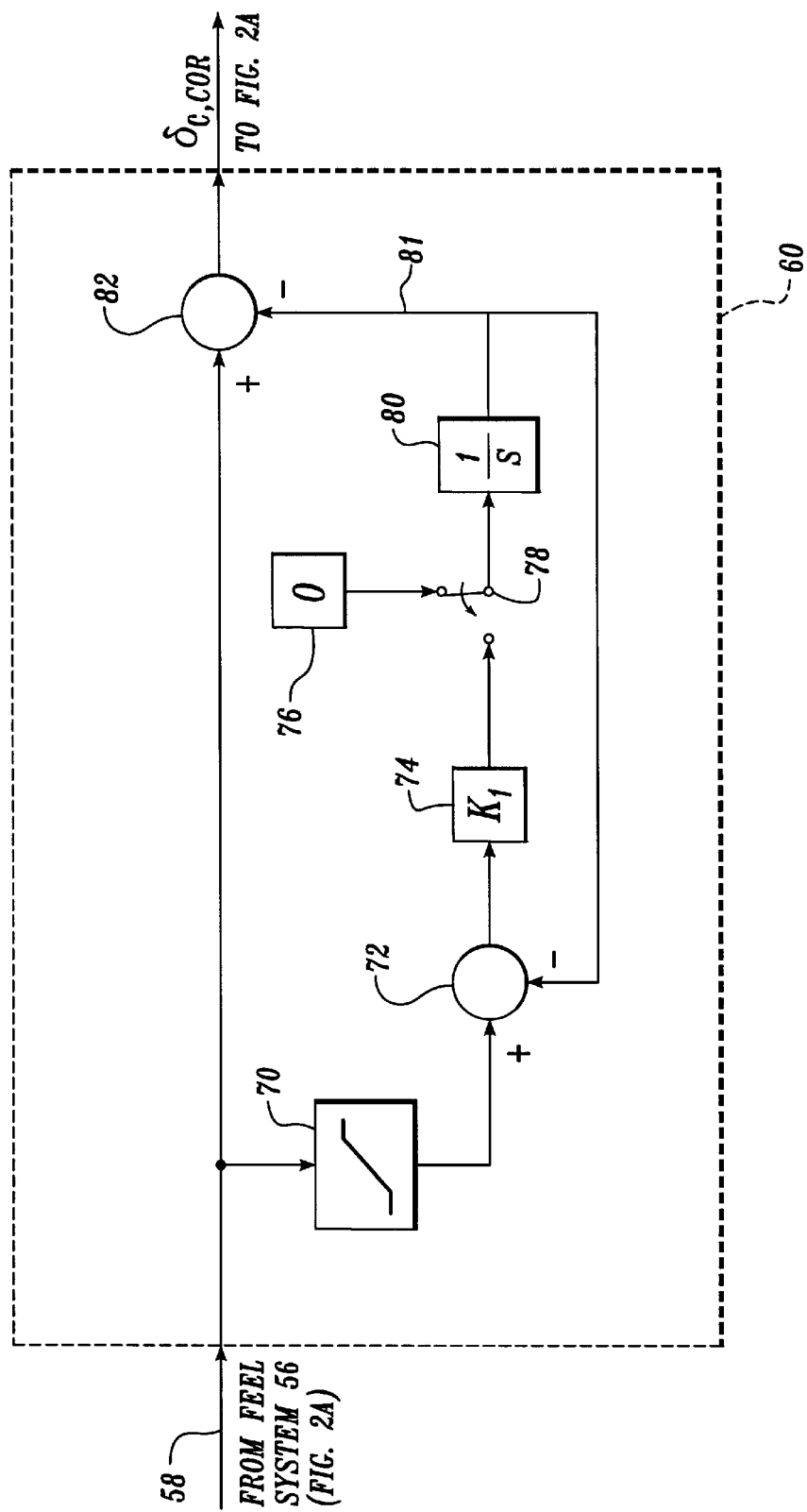
Figure 3:
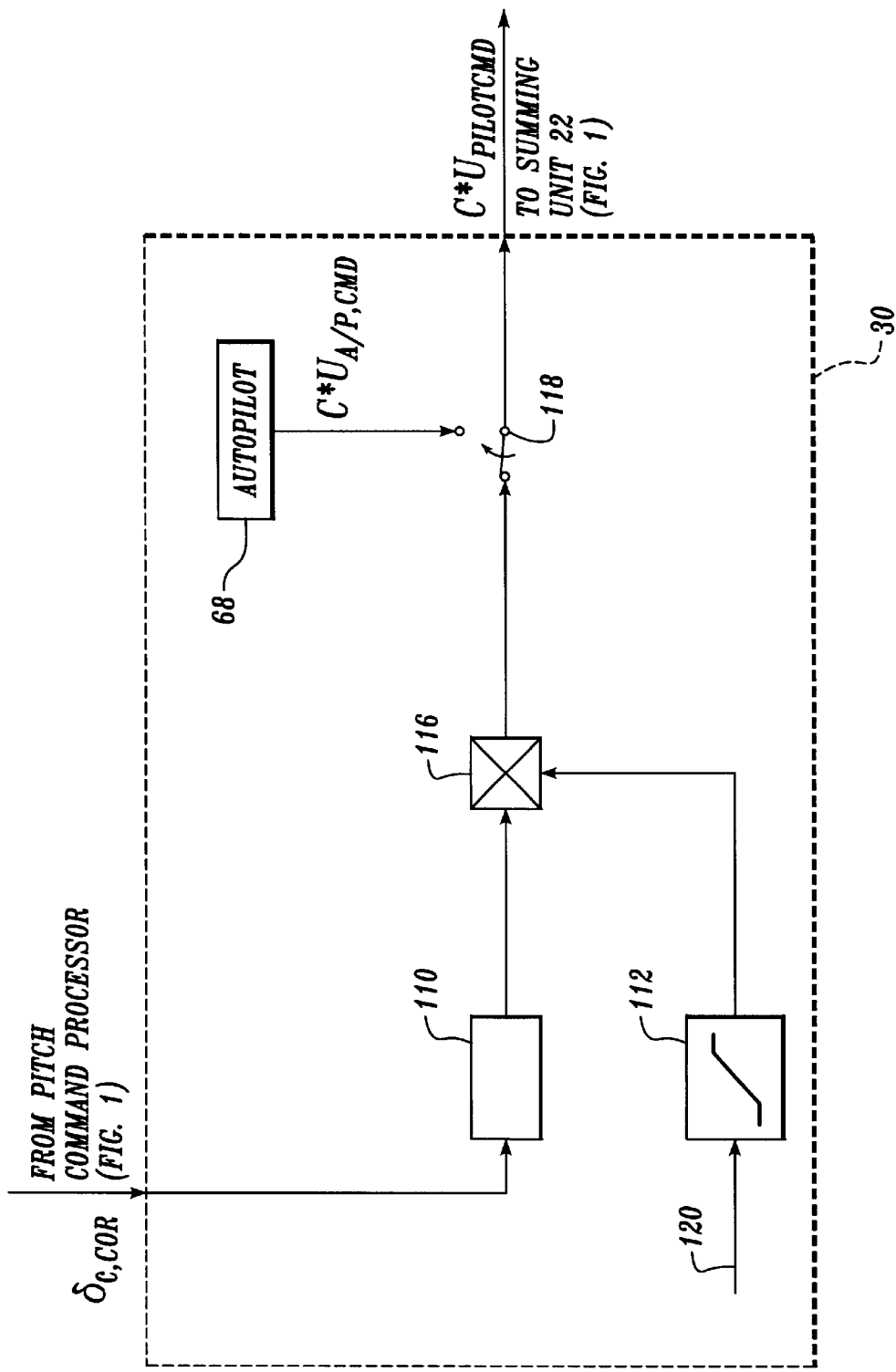
FIG. 3 is a control diagram of a commanded C*U processor of FIG. 1.

The pitch command processor 26 preferably operates to accomplish multiple tasks including managing the "feel" of the control column, interfacing with an external handling system, removing any column null bias, shaping the C*U feedforward command $C^*U_{FFC}$, and switching to an autopilot input mode when appropriate. The pitch command processor 26 also calculates a corrected column position signal $\delta_{C,COR}$ for use in other parts of the pitch-axis stability and command augmentation system 19. Of course, not all of these function may be appropriate to a particular application. The primary task of the pitch command processor 26 is that of converting a pilot column input signal $\delta_C$ into a C*U elevator position (here, $C^*U_{FFC}$, preferably in units of degrees) and into a corrected column position signal $\delta_{C,COR}$ for use in a commanded C*U processor 30. The pitch command processor 26 is discussed in detail in section 2 below, and is shown in FIGS. 2a, 2b, and 2c. The commanded C*U processor 30 is discussed in detail in section 3, and is shown in FIG. 3.

Figure 6:
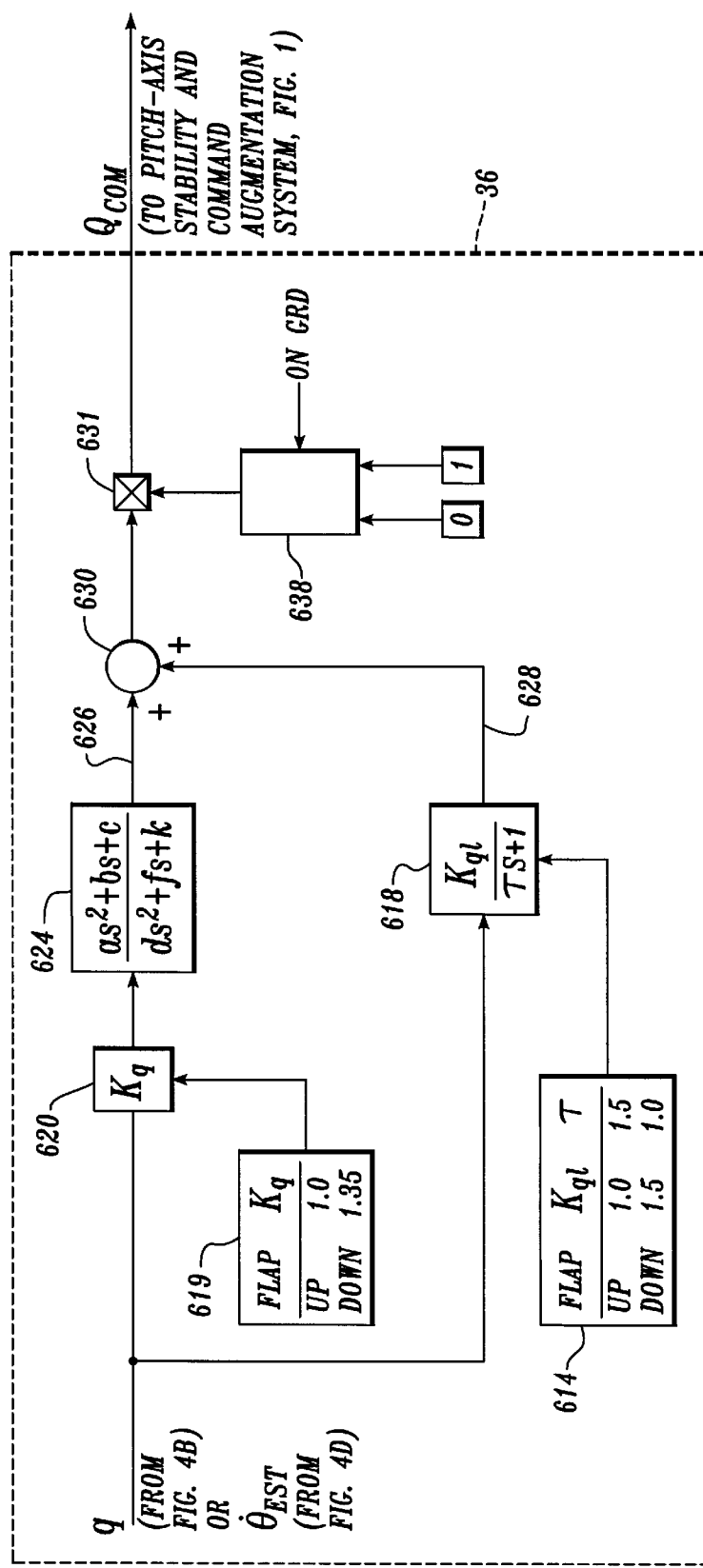
FIG. 6 is a control diagram of a pitch rate damping processor of FIG. 1.

The augmented feedback command $AFB_{COM}$ is generally formed lby modifying the combination of a C*U integral command $IC*U_{COM}$ and a pitch rate damping command $Q_{COM}$, by an elevator loop gain factor 29, at multiplier 25. The C*U integral command $IC*U_{COM}$ represents the integral of a C*U error signal, with C*U being defined in equation (2) above. The pitch rate damping command $Q_{COM}$ provides damping for the short period response and adjustment of the short period frequency. The pitch rate damping command $Q_{COM}$ is discussed in detail in section 6 below and is shown in FIG. 6. The combination of IC*U with $Q_{COM}$ is accomplished by combining unit 23. The modification of the combination is done by multiplier 25. The purpose of the elevator loop gain factor 29 is to provide sufficient stability margins for flutter modes. It is preferably a function of airspeed (e.g. Mach or calibrated airspeed). Depending on the precise application and embodiment to which the present invention is being used, all such elements discussed herein may not be necessary. Likewise, modifications of elements may be accomplished to shape the elevator command signal $\delta_{e,FILT}$ in any desired manner. The present invention encompasses any such changes.

As will be observed from FIG. 1, the preferred embodiment of the present invention also uses the augmented feedback command $AFB_{COM}$ to produce a trim negation signal TNS via a stabilizer off-load processor 21. The stabilizer off-load processor 21 adjusts the stabilizer such that elevator authority is available throughout the flight. Once the augmentation feedback signal command $AFB_{COM}$ exceeds a certain threshold position, the stabilizer is moved. As the stabilizer is moved, a stabilizer position sensor (not shown) senses the position of the stabilizer off-load processor 21 where it is multiplied by a gain and differentiated to form the trim negation signal TNS supplied to the integrator 28 to be added to the integral C*U command. In this manner, the stabilizer movement gives the elevator additional authority. Off-loading the elevator also helps to reduce drag penalty on the aircraft. Suitable stabilizer off-load processors 21 are known and may be used in the present invention. For example, trim negation commands are often provided by auto flight systems. The novelty of the present invention includes positioning the stabilizer offload processor 21 in that portion of the pitch-axis stability and command augmentation system 19 that represents the augmentation portion of the elevator pitch command signal $\delta_{e,FILT}$ only. This is important, since it is not desirable to move the stabilizers in short term maneuvers.

The C*U integral command $IC*U_{COM}$ represents the portion of the feedback of the pitch-axis stability and command augmentation system 19 that commands the elevators to return to their trimmed state in the absence of an input from the pilot. In the presence of a pilot column input signal $\delta_C$, the C*U integral command $IC*U_{COM}$ ensures that the airplane response meets the pilot request. The C*U integral command $IC*U_{COM}$ is formed by the integration of the C*U error signal $E_{C*U}$ in the C*U integrator 28. The C*U integrator 28 is discussed in detail in section 7 below. Integration of the error signal $E_{C*U}$ operationally results in the pitch-axis stability and command augmentation system 19 continuously attempting to zero out any difference between a pilot-requested C*U command $C*U_{PilotCmd}$ and the sum of a computed C*U signal $C*U_{Computed}$ with a compensation and protection C*U signal $C*U_{C\&P}$.

The pilot-requested C*U command $C*U_{PilotCmd}$ is formed in the commanded C*U processor 30 whose basic function is to convert the corrected column position signal $\delta_{C,COR}$ to a C*U form, namely pilot-requested C*U command $C*U_{PilotCmd}$. The commanded C*U processor 30 is discussed in section 3 below. The computed C*U signal $C*U_{Computed}$ is formed in the computed C*U processor 32 according to equation (2) and is discussed in section 4 below. The C*U compensation and protection signal $C*U_{C\&P}$ is formed in the compensation and protection processor 34 and is discussed in section 5 below.

A wide variety of control loop variations are possible in the present invention in order to accomplish its goals. The overall structure explained herein should therefore be taken an exemplary, and not restrictive. Although the presently preferred embodiment is disclosed herein, it is also to be understood that certain applications may not benefit from the inclusion of all elements. In a like manner, certain known control elements, not shown or described, could be added to obtain a specific desired result.

As a side note, the concepts of gains and of transfer functions are used at several points throughout the system and method of the present invention as depicted in the preferred embodiments. The concept of a transfer finction as used herein is to be interpreted broadly to include time lags or leads, amplification (linear or non-linear), attenuation, integration, and the like. Thus, the definition includes the concept of gain. These transfer functions in their various forms often are expressed mathematically in Laplace transform notation and can be realized in analog or digital form. Examples of analog means include linear amplifiers, capacitors, inductors, resistors and networks including some or all of these devices. Examples of digital means include binary adder-subtractors, comparators, inverters, controlled counters, and digital processors that sequentially process digitally encoded data.

As used herein, the term "combining means" is to be broadly interpreted, and includes signal combination in the digital or binary sense so that it includes addition, subtraction, multiplication, and division. These combining means may comprise analog devices, such as summing amplifiers or transistors, or they may comprise digital devices, such as binary adder-subtractors, comparators, or shift registers in an arithmetic logic unit of a central processing unit.

2. Discussion of Pitch Command Processor 26

2a. Pitch Command Processor 26

FIG. 2a is a block diagram of the pitch command processor 26, which was briefly described relative to the overall system arrangement of FIG. 1. As previously noted, the primary fuinctions of the pitch command processor 26 are to convert a pilot column input $\delta_C$ into the feedforward command $C*U_{FFC}$ portion of the elevator command $\delta_{e,FILT}$, and to generate the corrected column position signal $\delta_{C,COR}$ for use in the commanded C*U processor 30 of FIG. 1. In the arrangement depicted in FIG. 2a, the pilot column input signal $\delta_C$ is coupled to a feel system 56. As is known in the art, a feel system establishes mechanical force on the control column that must be overcome in moving the control column forward or aft of its neutral (detent) position. As is also known in the art, the forces established by a feel system increase with increasing control column deflection and, further, are established so that the column force characteristics vary with aircraft speed (less force being required at low-speed flights and more force being required for high-speed flight).

Although the present invention employs force relationships common to the prior art (provided by feel system 56 in FIG. 2a), those force relationships are supplemented by the invention to change the control column force characteristics in a manner that: (1) alerts the pilot to overspeed and underspeed conditions; (2) provides pilot expected command column flare response during landings; and (3) produces an abrupt, significant increase in column force in the event that aircraft angle of attack reaches and/or exceeds the stall value ($\alpha_{ss}$). The manner in which the invention is structured and operates during underspeed, overspeed, and landing flare conditions will be described relative to FIGS. 5a–5d. The provision of the invention that abruptly increases the command column force characteristic when the aircraft is near, or at stall, is indicated in FIG. 2 as a feel command system 52 and will be described relative to FIG. 2b.

Continuing with the description of FIG. 2a, feel system 56 supplies a command column displacement signal 58 that is coupled to a column null bias remover 60. The column null bias remover 60 receives the output signal of a linear variable differential transformer or other transducer that indicates the deflection of the command column from neutral (detent) (indicated by arrow 58 in FIG. 2a). As shall be described relative to FIGS. 2c, column null bias remover 60 provides compensation for signal offset or bias terms that may be present in the output signal of the column position transducer (i.e., any non-zero signal level that is provided by the transducer when the command column is at detent). The column null bias removal feature of the invention ensures that the aircraft will remain at the trim condition (i.e., at airspeed equal to C*U reference speed $V_{REF}$) when the command column is in the detent position.

The corrected column position signal $\delta_{C,COR}$ formed by the column null bias remover 60 in FIG. 2 is supplied to a transfer unit 64 of FIG. 2 and, in addition, as indicated in FIG. 1, is supplied to commanded C*U processor 30, which shall be described relative to FIG. 3.

Transfer unit 64 of FIG. 2 converts the corrected column position signal $\delta_{C,COR}$ provided by the column null bias remover 60 into the signal C*U$_{FFC}$, which is a portion of the elevator command signal $\delta_{e,UNF}$. As is known in the art, the signal transformation effected by transfer unit 64 is dictated by the particular feel system 56 being employed and other characteristics of the aircraft. As also is known in the art, the signal transformation effected by transfer unit 64 may be scheduled as a function of airspeed and is to be arranged to exhibit any required or desired frequency response.

As is indicated by switch 66 of FIG. 2a, the signal supplied by transfer unit 64 is coupled to summing unit 20 of FIG. 1 as the C*U feedforward command signal C*U$_{FFC}$, when the aircraft autopilot is not engaged. When an autopilot engage signal is supplied to switch 66, the autopilot 68 supplies its own version of a C*U feedforward command, C*U$_{A/P,FFC}$. Alternatively, as described previously, the autopilot can generate an equivalent tc or move the control column. Under these conditions, the switch 66 remains in the condition shown in FIG. 2a.

2b. Feel Command System 52

The feel command system 52 depicted in FIG. 2 combines two signal components 103, 97 that are used by the feel system 56 of FIG. 2 in generating appropriate command column force gradients. The first feel command signal component 103 corresponds to feel commands of the type used in conventional aircraft feel systems. Specifically, in the arrangement of FIG. 2b, signals (indicated by arrow 102) representative of one or more airdata parameters are supplied to a look-up table 100 or other arrangement that converts the airdata signals to feel command signals that exhibit desired force gradients as a function of aircraft airspeed and other parameters such as aircraft pitch rate. In the arrangement of FIG. 2b, the feel command signal 103 produced by look-up table 100 is not supplied directly to the aircraft feel system (e.g., feel system 56 in FIG. 1), but instead is supplied to a combining unit 98 where it is combined with the second feel command signal component 97.

In accordance with the invention, and as described below, the second feel command signal component significantly alters the force required for the pilot to maintain or move the control column aft of detent (nose up command) for low airspeeds (or high angle of attack). In the arrangement of FIG. 2b, a signal representative of aircraft filtered angle of attack (or, alternatively, filtered airspeed) (indicated by arrow 50) is supplied to an additive input to a combining unit 90. Supplied to a subtractive input of combining unit 90 is a signal (indicated by arrow 104 in FIG. 2b) representative of an angle of attack that is slightly beyond aircraft stick shaker angle of attack (or a signal representative of an airspeed slightly lower than stick shaker airspeed). As is known in the art, signals representative of stick shaker angle of attack and stick shaker airspeed are available from systems such as a warning electronics system or other systems that provide stall warning.

The output of combining unit 90 is supplied to a scaling unit 92, which has a gain factor that may be constant or may be scheduled in accordance with aircraft flap setting and/or one or more airdata signals indicative of aircraft airspeed. The scaling unit 92 establishes the force gradient that will be added to the nominal feel command force gradient when the aircraft is operating beyond angle of attack stick shaker (or below stick shaker airspeed). Scheduling the gain of scaling unit 92 in accordance with flap and/or airdata is not necessary in most situations, but can be included to obtain precise control over variations in control column force as a function of airspeed.

The signal supplied by scaling unit 92, which represents the difference between filtered angle of attack and a suitable value slightly beyond stick shaker angle of attack (or the difference between filtered airspeed and a suitable airspeed slightly less than stick shaker speed) is supplied to a limiter 94. Limiter 94 has an upper limit value of zero to eliminate signals produced when the filtered angle of attack is not above slick shaker angle of attack (minus the small margin)—or when filtered airspeed is not less than the stick shaker airspeed (plus the small margin). The lower limit of limiter 92 is selected to establish the maximum force that the arrangement of FIG. 2 will assert on the control column if it is aft of detent when the aircraft is beyond stick shaker angle of attack (or below stick shaker airspeed).

Continuing with the description of the arrangement of FIG. 2b, the signal supplied by limiter 94 is supplied to the second additive input of combining unit 98 via a rate limiter 96. Rate limiter 96 filters or smoothes the signal supplied to combining unit 98 to eliminate abrupt changes in signal level that may occur in aircraft signals representing aircraft angle of attack and filtered airspeed. As is known in the art, various other arrangements, such as a lag filter, can be employed to "smooth" a signal in a manner similar to rate limiter 96 of FIG. 2b. As previously noted, the signal supplied by combining unit 98 of FIG. 2 is supplied as the system feel command signal 54 to the aircraft feel system (56 in FIG. 2a).

2c. Column Null Bias Remover 60

The currently preferred control law for column null bias remover 60 of FIG. 2 is illustrated in FIG. 2c. As was described relative to FIG. 2a, the invention employs column position null bias correction to compensate for offset or bias components that may be present in the signal supplied by the command column position transducers when the associated command columns are in the neutral (detent) position.

In the arrangement depicted in FIG. 2c, the signal (indicated by arrow 58) supplied by the command column linear variable differential transformer (or other transducer) is supplied to an additive input of a combining unit 82, the output of which is supplied as the corrected column position signal $\delta_{C,COR}$. A compensation or correction signal 81 supplied in accordance with the invention is supplied to a subtractive input terminal of combining unit 82.

As is indicated in FIG. 2c, the correction signal 81 supplied by the invention is provided by an integrator 80, the output of which also is connected to the subtractive input of a combining unit 72. The additive input of combining unit 72 is supplied with the command column position transducer signal (arrow 58) via a limiter 70. The output of combining unit 72 is scaled by a gain factor $K_1$, by a scaling unit 74 and supplied to one terminal of a switch 78. The wiper of the switch is connected to the input of integrator 80. As is indicated at block 76, while switch 78 is not activated (i.e., is in the position shown in FIG. 2c), no input signal is supplied to integrator 80.

The arrangement of FIG. 2c operates as follows. Switch 78 is activated to connect the input of integrator 80 to the output of scaling unit 74 when the aircraft autopilot is not engaged and, in addition, there is little or no displacement of the control column from detent. Thus, when switch 78 is activated the signal supplied by the command column transducer is coupled to the input of integrator 80 via limiter 70, combining unit 72, and scaling unit 74, with the output signal that is provided by integrator 80 being fed back to the subtractive input terminal of combining unit 72. As will be recognized by those skilled in the art, this feedback arrangement corresponds to that of a conventional lag filter. Thus, except for a short time delay, the null bias correction signal 81 supplied to the subtractive input of combining unit 82 is equal to the signal being supplied by the command column transducer (as long as the command column transducer signal is within the range of limiter 70). Thus, when the control column remains in detent or neutral position, and the column control transducer signal is inside the range of limiter 70, the corrected column control signal supplied by combining unit 82 is substantially equal to zero. In that regard, the range of limiter 70 is set so that typical command column transducer bias or offset signals will be within the limiter range, but signals of a greater magnitude will not.

When the pilot applies force to the column to move the column out of detent, switch 78 deactivates so that no input signal is supplied to integrator 80 (indicated at block 76). With no signal supplied to the integrator 80, its output signal will remain constant. Thus, the signal supplied to the subtractive input of combining unit 82 will remain equal to the offset or bias component of the command column transducer. This means that the bias or offset component of the command column transducer signal will not be present in the corrected column position signal that is supplied by combining unit 82.

The switch 78 is actuated when forces are low or the force sensors indicate that forces are invalid or at fault. This allows the null bias remover to function satisfactorily even if a column force transducer signal becomes invalid, causing switch 78 to remain activated when the pilot moves the command column from detent. In particular, under such a failed condition, the signal path that includes combining unit 72, scaling unit 74, and integrator 80 will continue to function as a lag filter. However, since the input signal supplied to the additive input of combining unit 72 cannot exceed the range of limiter 70, only a small amount of command column position signal will be lost. In particular, the offset or bias signal of linear variable differential transformers and other position sensors used with the invention are typically no greater than a few percent of the maximum column deflection signal. That being the case, there is little or no noticeable effect on the pilot command column required for pitch control of the aircraft should switch 78 remain activated when the command column is moved from detent. Moreover, the arrangement continues to provide substantially zero output when the command column is actually in detent.

3. Discussion of Commanded C*U Processor 30

As was discussed relative to FIG. 1, the corrected column position signal supplied by column null bias remover 60 in FIG. 2 is supplied to a commanded C*U processor 30, which converts the corrected column position signal to a C*U pitch command signal that represents pilot input (C*$U_{PilotCmd}$ signal in FIG. 1). As also was discussed relative to FIG. 1, the pilot C*U pitch command signal is supplied to combining unit 22 where it is combined with C*U compensation and protection signal C*$U_{C\&P}$ (discussed relative to FIGS. 5a–d) and a computed value of C*U pitch command C*$U_{Computed}$ (which will be discussed relative to FIG. 4).

In the commanded C*U processor 30 that is shown in FIG. 3, the corrected control column position signal $\delta_{C,COR}$ is supplied to a filter 110 or an equivalent arrangement that provides signal shaping in a manner that converts the corrected column position signal $\delta_{C,COR}$ to a pitch control signal having the desired characteristics (i.e., the desired relationship between control column displacement and pitch attitude command). A signal representative of impact pressure (or another airdata signal representative of airspeed), indicated by arrow 120, is supplied to a scaling unit 112. The gain schedule of scaling unit 112 is established so that the output signal provided by the arrangement of FIG. 3 will result in a C*U signal exhibiting relatively consistent stick force per g throughout the flight envelope. A multiplier 116 combines the signal provided by scheduling unit 112 and the signal provided by filter 110 to supply a pilot-requested C*U command C*$U_{PilotCmd}$. As is indicated by switch 118, the signal supplied by multiplier 116 is supplied to summing unit 22 of FIG. 1 whenever the autopilot (68 in FIG. 3) is disengaged. If the autopilot is engaged, a C*U command signal generated by the autopilot, C*$U_{A/P,CMD}$, is coupled to summing unit 22 of FIG. 1 via switch 118. In situations in which the autopilot command is in terms. of column command, switch 118 remains in the position depicted in FIG. 3.

4. Discussion of Computed C*U Processor 32

4a. Computed C*U Processor 32

The computed C*U processor 32 is the portion of the pitch-axis stability and command system that determines C*U based on current (referred to herein as feedback) values. Combining equations (1) and (2) yields the following criterion:

$$C^*U = N_z + K_q q - K_v (V_{CAS} - V_{REF}) \tag{4}$$

The signal processing effected by the computed C*U processor 32 implements this equation.

As shall be described in sections 4c and 4d, in the C*U implementation of the currently preferred embodiments, the normal acceleration $N_z$ and the airplane pitch rate q are referenced to earth, rather than the body of the airplane.

Figure 4A:
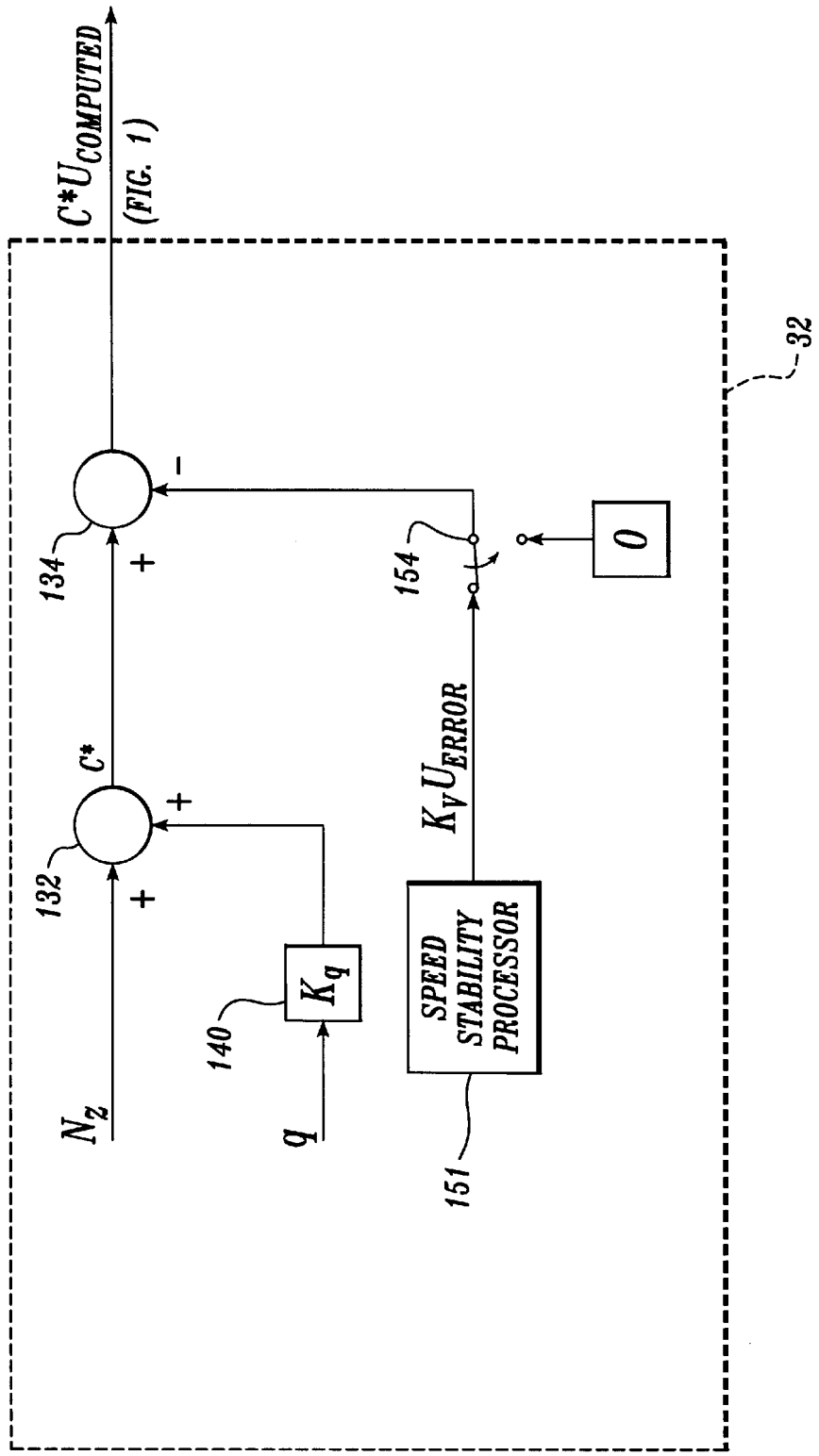
FIG. 4a is a control diagram of a computed C*U processor of FIG. 1.

The C* portion of equation (4) is produced at a combining unit 132 shown in FIG. 4a, which has a signal of normal acceleration $N_Z$ as an additive input. A pitch rate signal q is scaled by a gain factor $K_q$ by scaling unit 140. The scaling unit 140 output is supplied to the combining unit 132 as a second additive input. The combining unit 132 supplies the C* criterion. The input signals $N_z$ and q are preferably formed as described in FIGS. 4b, 4c, and 4d, where normal acceleration signal $N_Z$ is preferably a turn compensated normal acceleration signal with respect to the earth reference frame (based on symbol $\ddot{z}_{EST}$ in FIG. 4c). Likewise, pitch rate signal q is preferably a turn compensated pitch rate signal with respect to the earth reference frame (based on symbol $\dot{\theta}_{EST}$ in FIG. 4d). The processors used to form $\ddot{z}_{EST}$ and $\dot{\theta}_{EST}$ are discussed in sections 4c and 4d below.

The second part of equation (4), the speed stability signal $K_v(V_{CAS}-V_{REF})$, is formed in the speed stability processor 151. The C* criterion is an input to a combining unit 134 as is the speed stability signal $K_v(V_{CAS}-V_{REF})$. Combining unit 134 supplies the entire computed C*U signal C*U$_{Computed}$ to combining unit 22 used in FIG. 1 to create error signal $E_{C*U}$ as described in section 1 above.

In the preferred embodiment of the computed C*U signal processor 32, a switch 154 allows the speed stability processor 151 to supply the speed stability signal $K_v(V_{CAS}-V_{REF})$ unless the autopilot is in use. When the autopilot is in use, the switch activates to receive a zero input. The autopilot used with the currently preferred embodiments of the invention includes means to control airspeed. If a particular application of the present invention is used without an autopilot, or with one not having airspeed control, this particular switch 154 may not be necessary.

The pitch rate gain $K_q$ is equal to 0.217 according to the classical C* criterion. A different value may be selected based on pilot preferences. This value, however, has the benefit of producing a C* that has contributions from $N_Z$ and q that are equal at a true airspeed of 400 ft/sec. The values used to form $N_Z$, q, and $K_v(V_{CAS}-V_{REF})$ are based on airplane normal acceleration, pitch rate, and velocity error. The forming of these terms is discussed below.

4b. Turn Compensation Processor 200

Figure 4B:
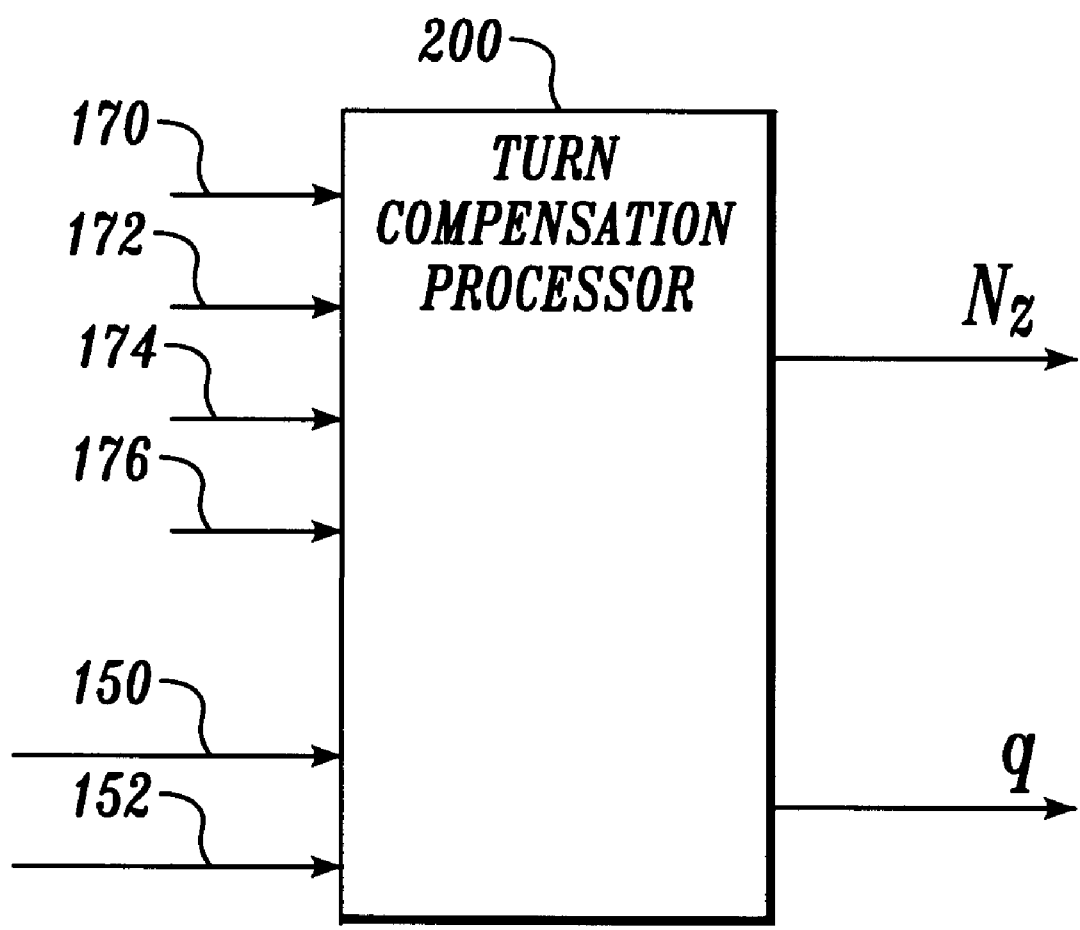
FIG. 4b is a control diagram of a turn compensation processor.

FIG. 4b shows a turn compensation processor 200 used to generate the normal acceleration $N_Z$ and pitch rate q signals used in the computed C*U processor 32 and the speed stability processor 151. Turn compensation processors 200 are known in the art of stability and control system design and thus, are only generally described herein. When an aircraft is banked, the lift acting on the plane is still normal to its wing surface. This causes the amount of lift acting normal to the earth's surface to decrease, further causing the plane to lose altitude. In order to continue flying at the same altitude as when not banked, the aircraft must increase its lift in order to compensate for the decrease in lift in the direction normal to the earth's surface.

Turn compensation is therefore provided to add elevator pitch to compensate for the increased lift required to sustain level flight, without additional column input signal $\delta_C$ required from the pilot. The inputs to the turn compensation processor 200 include signals of roll attitude 170, pitch attitude 172, body-referenced normal acceleration 174, body-referenced pitch rate 176, flight path vertical acceleration estimate 150, and pitch attitude rate estimate 152. The outputs of the turn compensation processor 200 include turn compensated signals of normal acceleration $N_Z$ and pitch rate q. In current embodiments of the invention, turn compensation is only provided for bank. angles less than 30 degrees and is gradually removed for high bank angles.

Figure 4C:
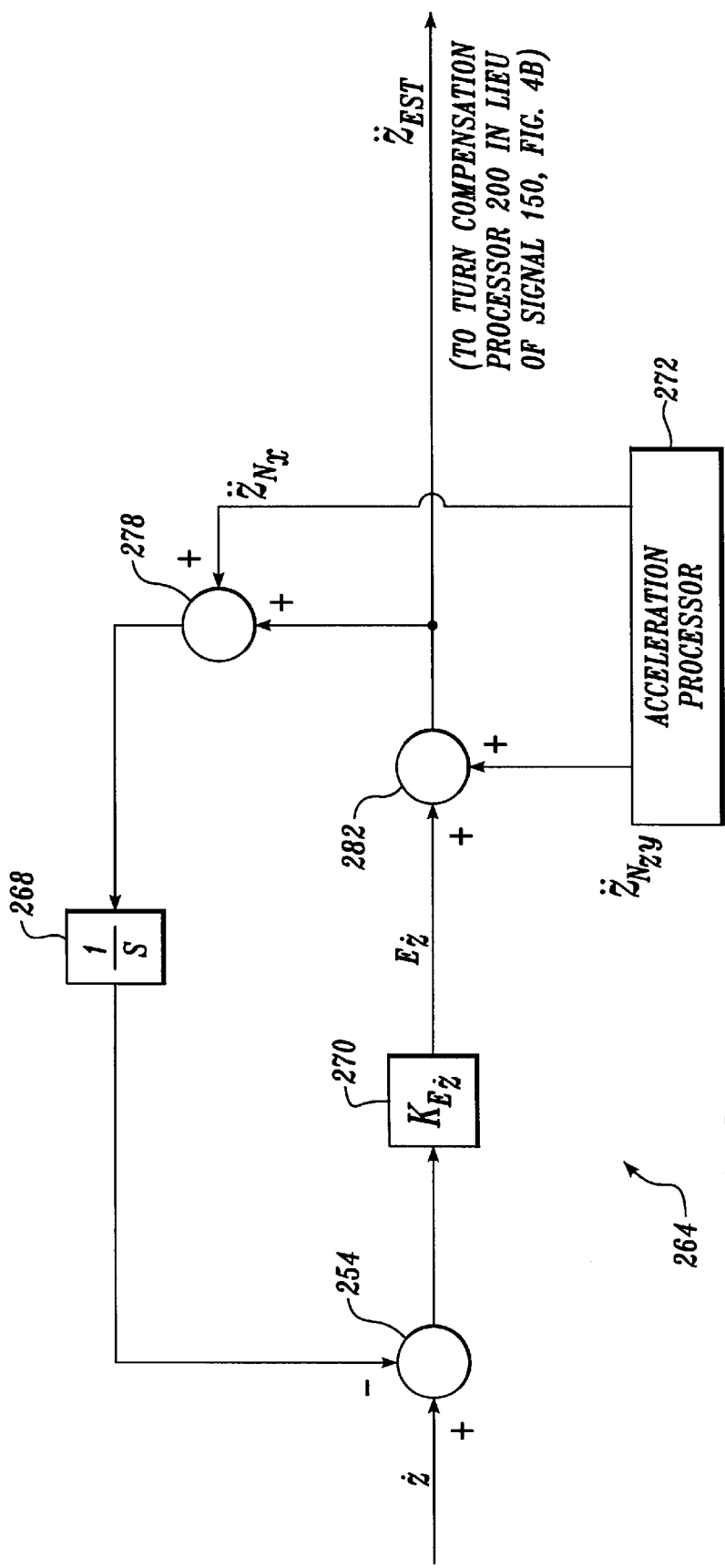
FIG. 4c is a control diagram of a pitch rate complementary filter.
Figure 4D:
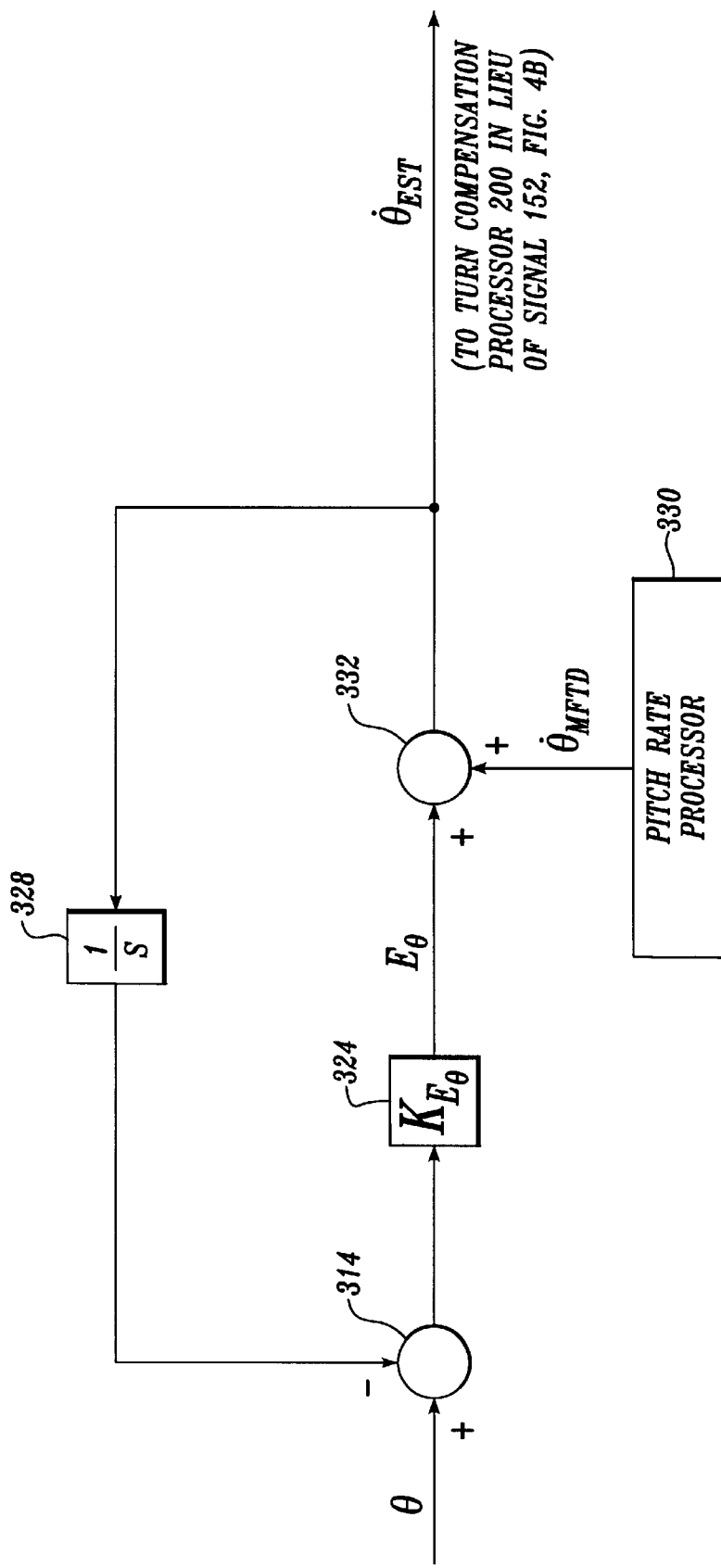
FIG. 4d is a control diagram of a normal acceleration complementary filter.

The present invention improves upon previous compensation arrangements by using improved input signals representative of flight path vertical acceleration 150 and pitch attitude rate 152 that are referenced to the earth instead of an inertial reference. The formation of an earth-referenced flight path vertical acceleration 'signal 150 is discussed in section 4c and is shown in FIG. 4c. The formation of an earth-referenced pitch attitude rate signal 152 is discussed in section 4d and is shown in FIG. 4d.

4c. Normal Acceleration Complementary Filter 264

The normal acceleration complementary filter 264 produces an earth-referenced flight path vertical acceleration signal 150 which in turn results in an earth-referenced normal acceleration signal $N_Z$. Usually, normal acceleration $N_Z$ is the acceleration of the airplane with respect to an inertial-reference frame. The pitch-axis stability and command system 19 of the present invention is attempting to control the airplane to a normal acceleration that is referenced to the earth instead of the plane. Using an earth-referenced normal acceleration instead of an inertia-referenced normal acceleration, results in the advantageous handling characteristic of being able to fly to a constant vertical speed (including zero vertical speed) about a round earth (i.e., the airplane will fly around the round earth in the absence of pitch input commands). Controlling to an inertia-referenced normal acceleration does not result in aircraft vertical speed that is constant with respect to the earth.

The earth-referenced vertical speed $\dot{z}$ can be diffentiated to produce an earth-referenced normal acceleration $\ddot{z}$, however, differentiating $\dot{z}$ can introduce a not insignificant amount of undesirable noise. As illustrated in FIG. 4c, the present invention uses a complementary filter to combine a manufactured normal acceleration signal $\ddot{z}_{MFTD}$ with $\dot{z}$ to form an earth-referenced flight path vertical acceleration estimate signal $\ddot{z}_{EST}$ that may be used in lieu of the flight path vertical acceleration signal 150 of turn compensation processor 200. This results in the turn processor 200 supplying a turn compensated, earth-referenced, normal acceleration signal $N_{z,e}$. This signal $N_{z,e}$ is superior to the usual normal acceleration signal $N_Z$ because it allows the airplane to fly around the earth in the absence of pilot input. Earth-referenced normal acceleration $N_{z,e}$ may be substituted for the normal acceleration signal $N_Z$ supplied to the computed C*U processor 30 as well as other portions of the pitch-axis stability and command augmentation system 19.

The generation of a normal acceleration signal $\ddot{z}_{MFTD}$ is effected by mapping body-referenced accelerations onto the earth-referenced z-axis. This process is known in the art of airplane stability and control system design and is indicated in FIG. 4c by an acceleration processor 272. The earth-referenced vertical speed $\dot{z}$ is typically received from an airdata system having an inertial reference system.

As shown in FIG. 4c, the earth-referenced flight path vertical acceleration estimate signal $\ddot{z}_{EST}$ is supplied by a combining unit 282 having two signals as additive inputs. The first signal is a portion of the manufactured normal acceleration signal in the z-y plane $\ddot{z}_{N_{ZY}}$. The second signal is a vertical speed error $E_{\dot{z}}$ supplied by a scaling unit 270 having a gain factor $K_{E_{\dot{z}}}$. The input to scaling unit 270 is supplied by a combining unit 254 having inputs of earth-referenced vertical speed $\dot{z}$ and the integral of a signal supplied by a combining unit 278. The integration is accomplished at an integrator 268 in FIG. 4c. The signal supplied by combining unit 278 is formed by additive inputs of the earth-referenced flight path vertical acceleration estimate signal $\ddot{z}_{EST}$ and a portion of the manufactured normal acceleration signal in the longitudinal axis of the airplane, $\ddot{z}_{N_x}$.

As can be appreciated, the normal acceleration complemental) filter 264 uses the earth-referenced vertical speed $\dot{z}$ to drive the steady-state characteristics of the earth-referenced flight path vertical acceleration estimate signal $\ddot{Z}_{EST}$. The earth-referenced flight path vertical acceleration estimate signal $\ddot{Z}_{EST}$ is used in the computed C*U processor, and in the C* and/or C*U process. The turn-compensated earth-referenced normal acceleration signal $N_{z,e}$ is preferably used in the computed C*U processor, although it is possible to use the turn compensated inertial referenced uncompensated normal acceleration estimate signal $\ddot{z}_{EST}$, or the uncompensated inertial referenced normal acceleration signal 150.

4d. Pitch Rate Complementary Filter

The pitch rate complementary filter produces pitch attitude rate signal 152 with respect to the local horizon. Although, the pitch attitude rate normally is the angular rate of the airplane with respect to the inertia-reference frame, the pitch-axis stability and command augmentation system 19 of the present invention controls the airplane to a pitch attitude rate that is referenced to the earth. Using an earth-referenced pitch rate instead of an inertia-referenced pitch rate, is advantageous because it provides the ability to fly to a constant flight level about a round earth. Controlling to a body-referenced pitch rate does not make the airplane fly around the earth by itself and pilot needs to make correction.

The earth-referenced pitch attitude $\theta$ could be differentiated to produce an earth-referenced pitch rate $\dot{\theta}$, however, differentiating $\theta$ can introduce a not insignificant amount of undesirable noise. As illustrated in FIG. 4d, the present invention uses a complementary filter to combine a manufactured pitch attitude rate signal $\dot{\theta}_{MFTD}$ with $\theta$ to form an earth-referenced pitch attitude rate estimate signal $\dot{\theta}_{EST}$ that may be used in lieu of the pitch attitude rate signal 152 of turn compensation processor 200. This results in the turn processor 200 supplying a turn compensated, earth-referenced, pitch attitude rate signal $q_e$. This signal $q_e$ is superior to the usual pitch attitude rate q because it provides advantageous long-term airplane response. Earth-referenced pitch attitude rate signal $q_e$ may be substituted for the pitch attitude rate q supplied to the computed C*U processor 30 as well as other portions of the pitch-axis stability and command augmentation system 19.

The manufactured pitch attitude rate signal $\dot{\theta}_{MFTD}$ is formed by mapping the inertia-referenced pitch rate q, roll rate y, and yaw rate p onto the earth-reference frame. This task is known in the art of airplane stability and control system design and is indicated in FIG. 4d by a pitch rate processor 330. The earth-referenced pitch attitude $\theta$ is typically received from an air data system having an inertial reference system.

As shown in FIG. 4d, the earth-referenced pitch attitude rate estimate signal $\dot{\theta}_{EST}$ is supplied by a combining unit 332 having two signals as additive inputs. The first signal is the pitch attitude rate signal $\dot{\theta}_{MFTD}$ supplied by pitch rate processor 330. The second signal is a pitch attitude error $E_\theta$ supplied by a scaling unit 324 having a gain factor $K_{E_\theta}$. The input to scaling unit 332 is supplied by a combining unit 314 having an additive input of earth-referenced pitch attitude signal $\theta$ and a subtractive input representative of the integral of the earth-referenced pitch attitude rate estimate signal $\dot{\theta}_{EST}$. The integration is accomplished at an integrator 328 in FIG. 4d.

As can be appreciated, the pitch rate complementary filter uses the earth-referenced pitch attitude $\theta$ to derive the steady-state characteristics of the earth-referenced pitch attitude rate estimate signal bar. The turn compensated earth-referenced pitch attitude rate signal $q_e$. is preferably used in the computed C*U processor, although it is possible to use the turn-compensated inertial-referenced pitch rate q, the earth-referenced uncompensated pitch rate estimate $\dot{\theta}_{EST}$, or the uncompensated inertial referenced pitch attitude rate signal 152.

4e. Speed Stability Processor 150

The speed stability processor 150 provides a speed stability feedback signal $K_v U_{error}$ that includes a direct trim signal 372 and a phugoid damping feedback signal 400. In addition, the speed stability processor 150 uniquely determines the C*U reference speed $V_{REF}$ based on the current position of a pitch trim device 354.

In the depicted arrangement, the reference speed $V_{REF}$ is established with a pitch trim device 354, such as a thumb switch or aisle stand lever, that has three positions, with the normal position (unactivated) of the trim device 354 producing a pitch trim signal 364 equal to zero.

When the pilot adjusts the pitch trim device 354, the pitch trim signal 364 is generated that represents either −1 or +1, depending on whether the pilot is trimming nose-up or nose-down. The pitch trim signal 364 is multiplied at multiplier 370 by a gain $K_t$, converting it into a rate of change of reference airspeed (signal 378). As long as the pilot is adjusting the pitch trim device 354, the rate of change of reference airspeed signal 378 will continue to be integrated at integrator 376, thus forming a new reference speed signal 382. If desired, the value of $K_t$ may be a function of airdata.

Items 374, 375, and 380 of FIG. 4e relate to the setting of an initial value for $V_{REF}$. Item 374 is an initialization and synchronization events processor having an output trigger 375 that, when set to true, signals the integrator 376 to use, as its input, the current filtered airspeed $V_{CAS}$, indicated in FIG. 4e as dashed line 380. When the output trigger 375 is set to false, the integrator 376 uses the rate of change of reference airspeed signal 378 described above.

The logic-used by the initialization and synchronization events processor 374 preferably sets the output trigger 375 to true for either of the following conditions: (1) The output trigger 375 is set to true after takeoff for a predetermined period of time T unless the longitudinal aircraft acceleration has decreased to less than a preselected value for a given amount of time during the predetermined period T. (2) The output trigger 375 is set to true when the airspeed difference $U_{ERROR}$ is within a predefined range at the time the trim device is returned to its zero value. The first condition is to provide an initial reference speed after take-off. The second condition is to reduce pilot workload needed to trim the airplane.

The initial reference speed signal 382 is limited by a limiter 384 having minimum and maximum speed limits. These limits are based on the flight envelope of the aircraft as determined by its particular configuration. The minimum limits are described in the stall protection processor portion of section 5. The maximum speed limits are applied so that both the resulting reference speed $V_{REF}$ and its corresponding reference Mach, are at or below maximum operating velocity $V_{MO}$ and maximum operating Mach $M_{MO}$.

Although the pilot can adjust the reference speed $V_{REF}$ by using the pitch trim device 354, it is not possible to trim the aircraft to speeds outside of the speed range established by limiter 384. This feature is desirable in that it requires the pilot to hold the column in a non-neutral position in order to overspeed or underspeed the airplane, thereby alerting the pilot to the overspeed or underspeed condition.

The resulting reference speed $V_{REF}$ is then combined at combining unit 398 with current filtered calibrated airspeed $V_{CAS}$ to form the airspeed difference $U_{ERROR}$. Filtered calibrated airspeed based on $V_{CAS}$ is supplied to the speed stability processor 151 by an air data unit. It is preferable that $V_{CAS}$ be adequately filtered prior to being supplied to the processor 151 in order to eliminate signal content caused by turbulence. Other airspeed signals may be used if desired, e.g., Mach, or unfiltered calibrated airspeed, assuming the related gains and schedules are established appropriately.

At a combining unit 396, $U_{ERROR}$ is combined with a direct trim signal 372 to form an enhanced $U_{ERROR}$ (signal 404). The direct trim signal 372 is computed in a direct trim signal processor 356. The function of the direct trim signal 372 is to provide additional elevator command so as to emulate the immediate response of the elevators in a conventional airplane relative to the activation of a trim device. Airspeed airdata or flap position is used to create the direct trim signal 372 which is given the appropriate sign depending on whether the airplane is being trimmed using pitch-up or pitch-down, which is indicated by input signal 364.

The enhanced $U_{ERROR}$ signal 404 is multiplied by an airspeed gain $K_v$ at multiplier 406. This results in a preliminary speed stability feedback signal 408. The airspeed gain $K_v$ is used to set the stick force required in pounds per knot of deviation of airplane speed from reference speed. If desired, the value of $K_v$ may be a function of airdata.

Finally, combining unit 410 combines the preliminary speed stability feedback signal 408 with a phugoid damping feedback signal 400 received from a phugoid damping feedback processor 344. The purpose of including the phtigoid damping signal in the speed stability feedback signal $K_V U_{ERROR}$ is to provide adequate damping to phugoid mode. Such processors 344 are known in the art of airplane stability and control system design. The resulting signal is the speed stability feedback signal $K_V U_{ERROR}$ used in the computed C*U processor 32 described above. A dead zone may be placed on $U_{ERROR}$ so that speed stability is only provided when $U_{ERROR}$ is greater than a predetermined value. Such a dead band will provide neutral speed stability for a band of speeds that includes the trim speed.

5. Discussion of Compensation and Protection Processor 34

As was mentioned relative to FIG. 1, the invention includes a compensation and protection processor (34 in FIG. 1), which provides a compensation and protection signal $C^*U_{C\&P}$ which is combined with the difference between the computed C*U signal $C^*U_{Computed}$ and the pilot commanded C*U pitch command $C^*U_{PilotCmd}$ to produce the C*U error signal $E_{C^*U}$.

Figure 5A:
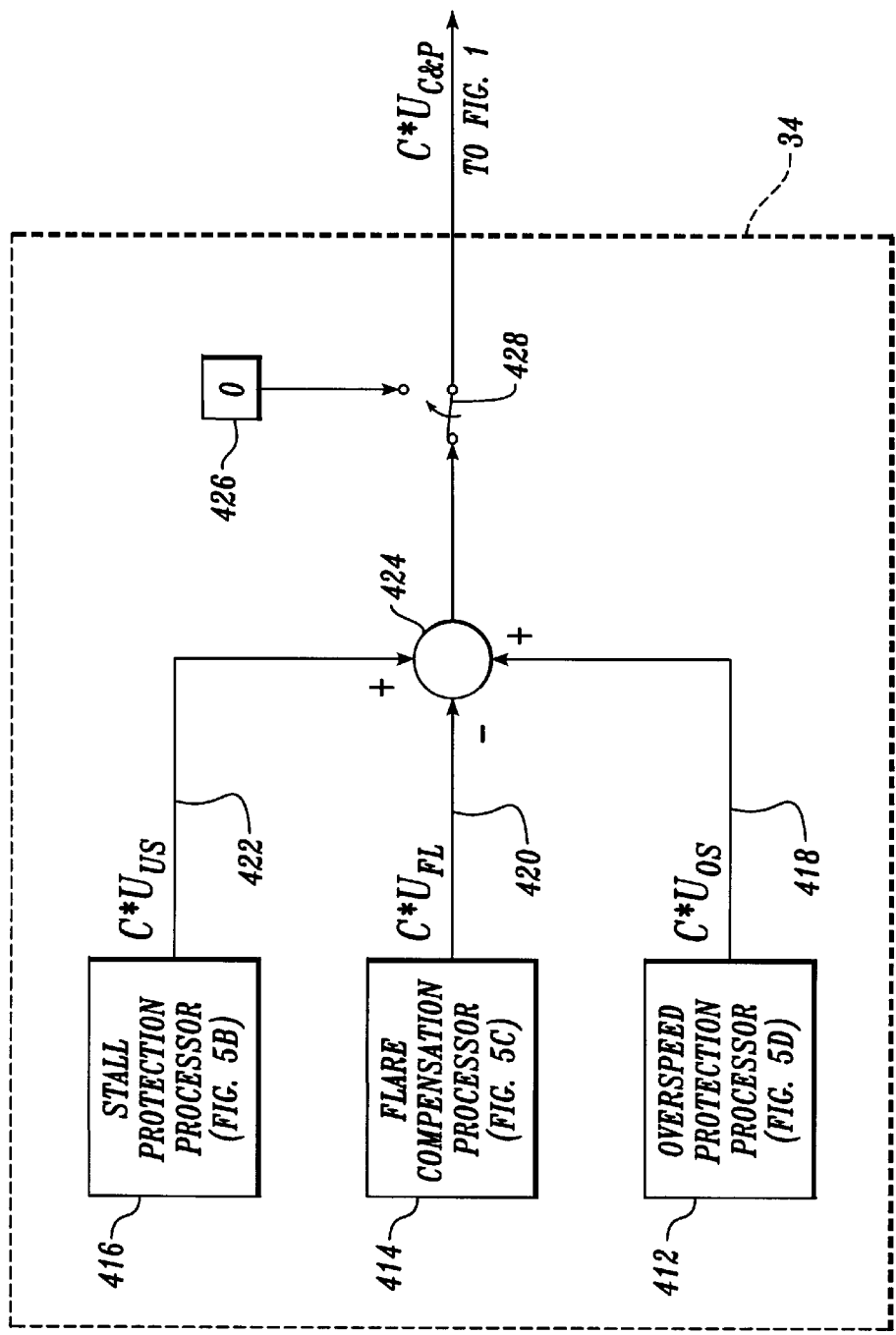
FIG. 5a is a control diagram of a compensation and protection processor of FIG. 1.

With reference to FIG. 5a, the compensation and protection processor 34 of the currently preferred embodiment of the invention includes a stall protection processor 416, which supplies a C*U underspeed protection signal ($C^*U_{US}$); a flare compensation processor 414, which provides a C*U flare compensation signal ($C^*U_{FL}$); and an overspeed protection processor 414, which provides a C*U overspeed protection signal ($C^*U_{OS}$). The signals provided by stall protection processor 416, flare compensation processor 414 and overspeed protection 412 are supplied to input terminals of the combining unit via signal paths 422, 420 and 418 respectively. In the depicted arrangement, the output signal or combining unit 424 is supplied to a switch 428, which may or may not be activated by the aircraft autopilot engage signal depending upon system design choice.

5a. Stall Protection Processor 416

Stall protection processor 416 functions to: (1) establish a lower limit on the value of the reference speed that can be set by the flight crew; and (2) increase the magnitude of the system speed stability feedback during underspeed operation, which provides greater nose down corrective command and pilot awareness of underspeed.

Figure 5B:
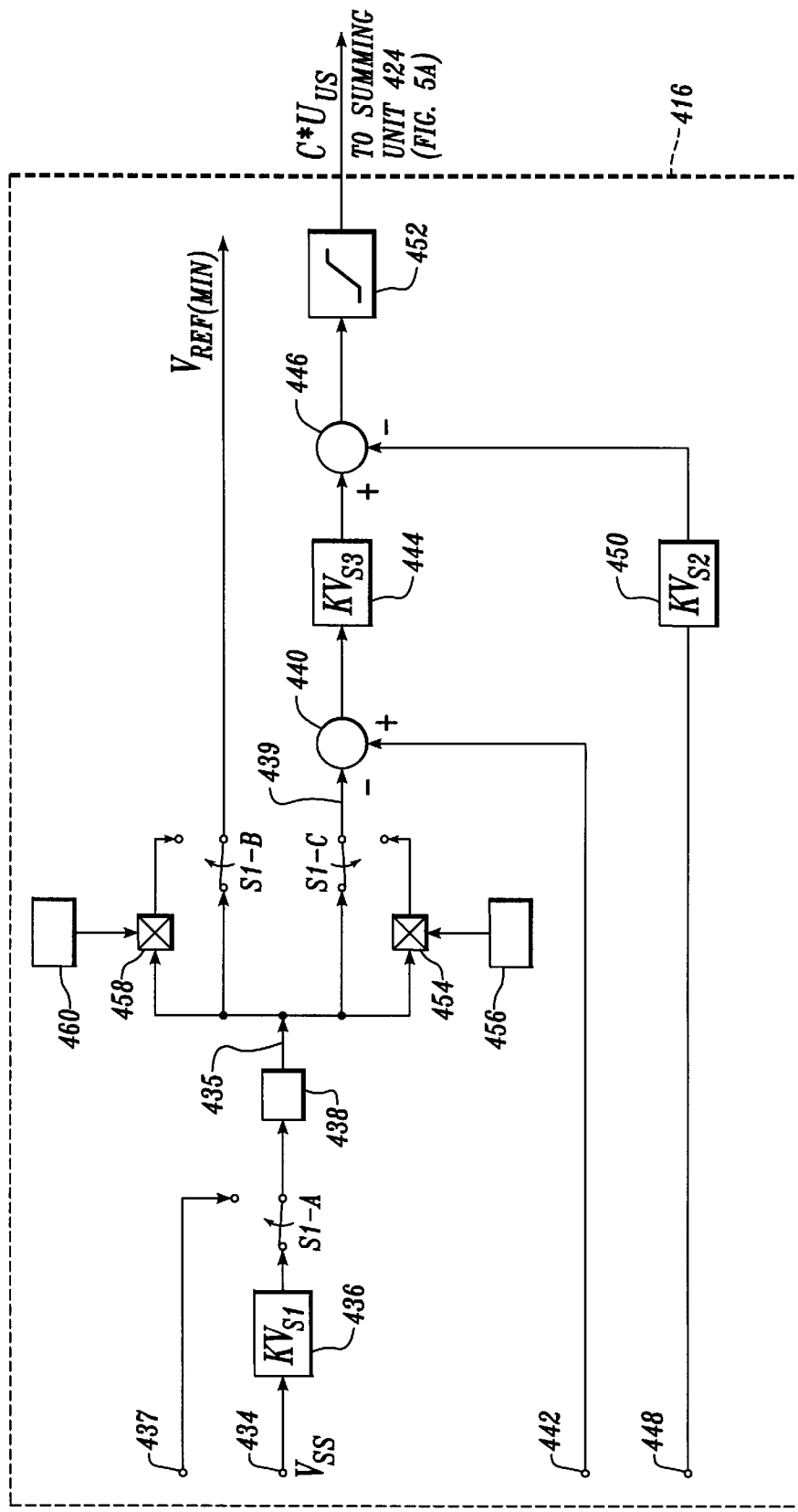
Figure 5E:
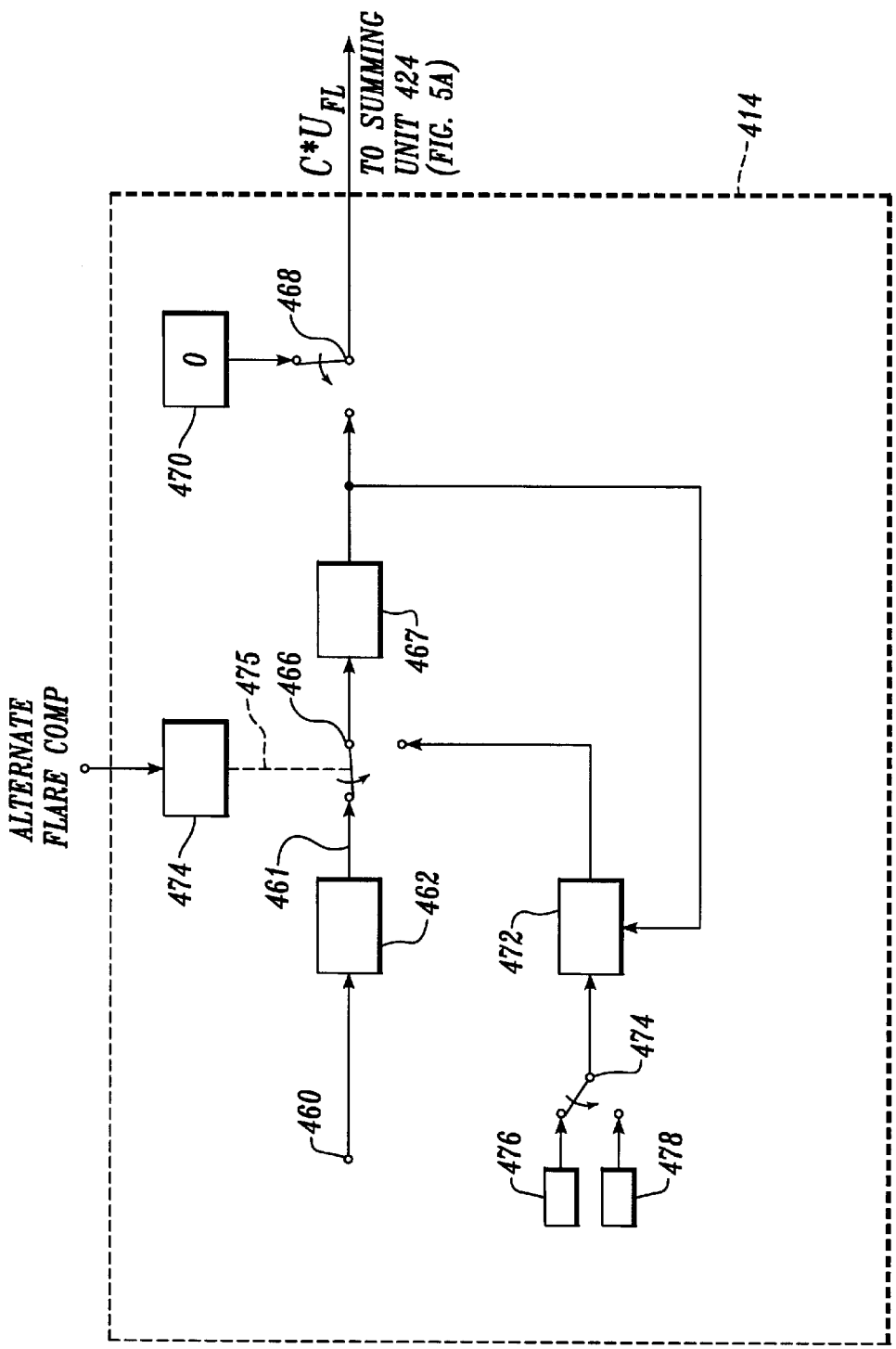

The currently preferred embodiment of stall protection processor 416, which is depicted in FIG. 5b, has two operational modes. The first operational mode is a take-off mode that provides an underspeed protection signal $C^*U_{US}$ and a lower limit for the C*U reference speed, $V_{REF(MIN)}$, only during the initial phase of the aircraft take-off operation. Specifically, during the initial take-off phase, both the C*U underspeed protection signal and the minimum value of the C*U reference speed are established to provide pitch performance characteristics that allow a pilot to take appropriate action should an engine fail. The second mode of operation of the stall protection processor shown in FIG. 5b is the post take-off mode of operation in which the processor supplies a C*U underspeed protection signal and a minimum value of C*U reference speed that are matched to operation of the aircraft in normal flight regions. In both modes of operation, the value of the underspeed protection signal and the minimum value of the C*U reference speed are set with respect to the low speed amber band value, which is commonly referred to as "the top of the amber band." As is known in the art; the top of the amber band corresponds to the speed at which the aircraft can execute a 40 degree bank turn without angle of attack reaching "stick shaker," or onset of buffet, i.e., without reaching a flight condition in which the flight crew is warned of impending stall or onset of buffet.

The arrangement of FIG. 5b automatically switches between the early take-off and the post-take-off mode, with the associated signal switching being indicated by conventional switches S1-A, S1-B, S1-C, each of which is depicted in the reduced trim limit mode. In the currently preferred embodiments of the invention, switching to the post take-off mode of operation occurs only if three conditions are met. In particular, switching occurs: (1) if a predetermined time has elapsed since take-off (e.g., 15 seconds); and, (2) aircraft airspeed is greater than the top of the amber band by a predetermined amount (e.g., four knots); and, in addition, (3) the C*U reference velocity, $C^*U V_{REF}$, set by the flight crew exceeds the top of the amber band by a predetermined amount (e.g., four knots).

With switches S1-A, S1-B, S1-C in the position shown in FIG. 5b (take-off mode), the lower limit for the C*U reference speed, $V_{REF(MIN)}$ is established at a value that is below the top of the amber band. Specifically, in FIG. 5b, a signal representative of the stick shaker $V_{SS}$ is supplied to a terminal 434 by the aircraft warning electronic system or similar source. At block 436, $V_{SS}$ is scaled by a constant $KV_{S1}$ to provide a signal that is below the top of the amber band by the desired amount (e.g., one-half of the amber band speed value) to one terminal of switch S1-A. Passing through switch S1-A, the signal is filtered (by a rate limiter or lag filter 438) to eliminate any abrupt changes in the stick shaker speed signal $V_{SS}$, with the currently preferred embodiment of the invention employing rate limiting of approximately four knots per second. With the system in the reduced trim limit mode, the signal 435 supplied by rate limiter (or lag filter) 438 is transferred through switch S1-B as the C*U minimum reference speed $V_{REF(MIN)}$. Thus, it can be noted that during the early phase of take-off, the minimum C*U reference speed is below the top of the amber band, a feature which allows the pilot to trim below the top of the amber band, i.e., set a C*U reference speed that is below the top of the amber band. This feature is only necessary if the approximate speed for an engine out condition falls within the amber band.

With continued reference to FIG. 5b, during operation of the depicted stall protection processor in the reduced trim limit mode, the signal 435 supplied by rate limiter 438 also forms the stall protection underspeed reference signal 439, which is coupled to a subtractive input terminal of a combining unit 440 via switch S1-C. Combining unit 440 subtracts the stall protection underspeed reference signal 439 from a signal representative of the aircraft filtered airspeed, which is supplied to a terminal 442 in FIG. 5b and coupled to an additive input of combining unit 440. The output signal of combining unit 440 is thus representative of the difference between the filtered airspeed signal and the stall protection set speed for the underspeed signal. This speed signal provided by combining unit 440 is scaled by a gain factor $KV_{S3}$ at block 444 and is supplied to an additive input of a combining unit 446.

The gain factor $KV_{S3}$ is selected to obtain a desired change in the force that is required to move or hold the command column aft of its neutral position detent when the aircraft airspeed signal is less than the underspeed reference signal, i.e., when aircraft airspeed is less than a selected underspeed reference value. For example, as was described relative to FIG. 4e, the speed stability feedback feature of the invention establishes a predetermined control column force gradient that requires the pilot to assert additional column command in order to maintain airspeed that is above or below the reference speed ($V_{REF}$). In the currently preferred embodiments of the invention, the column force gradient required to fly at speeds above or below C*U reference speed is 3 pounds/knot. In these embodiments, gain factor $KV_{S3}$ of the depicted underspeed protection arrangement adds an additional 12 pounds/knot force gradient which comes into effect when airspeed is less than a selected underspeed value (approximately 0.5 times the top of the amber band with the arrangement of FIG. 5b operating in the take-off mode and the top of the amber band when in post take-off mode). The added column force requirement alerts the pilot to underspeed condition, but does not prevent conscious decision to maneuver the aircraft at low speed.

Returning again to the arrangement of FIG. 5b, combining unit 446 provides damping of the C*U underspeed signal $C^*U_{US}$ as a function of the aircraft pitch rate turn compensation. In the arrangement of FIG. 5b, a signal representative of pitch rate turn compensation is supplied to a terminal 448; scaled by an appropriate gain factor $KV_{S2}$ (indicated at block 450); and supplied to a subtractive input terminal of combining unit 446. The signal supplied by combining unit 446 is then processed by a limiter 452 and supplied as the reduced trim limit mode C*U underspeed command signal, $C^*U_{US}$. The upper limit of limiter 452 is preferably established at zero. That is, in the preferred embodiments of the invention, a C*U underspeed signal is not supplied (i.e., is equal to zero) whenever filtered airspeed is greater than the stall protection underspeed reference. Thus, the stall protection processor 416 will have no effect on the C*U protection and compensation signal when aircraft speed is above a predetermined value (approximately 0.5 times the top of the amber band for the currently preferred embodiment of the invention that is operating in take-off mode and top of the amber band when in the post take-off mode).

The lower limit of limiter 452 establishes the maximum amount of nose down pitch signal that can be supplied by the underspeed protection processor. In accordance with the invention this upper limit is set at a value that prevents the generation of underspeed protection pitch down command signals that cannot be overridden by the pilot forcefully operating the command column.

As previously noted, the stall protection processor in FIG. 5b automatically changes its mode of operation during the take-off procedure when there is no longer a need to allow the pilot to assert speed trim (set the C*U reference speed $V_{REF}$) below the top of the amber band. When the arrangement of FIG. 5b is switched out of the reduced trim limit mode (i.e., to the post-take-off mode), a signal representative of the top of the amber band supplied to the input of rate limiter 438 via terminal 437 and switch S1-A. Like the stick shaker speed signal used by the system in the reduced trim limit mode, the signal representative of the top of the amber band can be obtained from the aircraft warning electronic system or a similar source. Moreover, the signal representative of the top of the amber band can be derived from the stick shaker speed and vice versa, with little or no system performance loss. In this regard, the input to switch S1-A can be based on either or both top of the amber band (which is compensated for load factor) or stick shaker speed.

It can be noted that, when the arrangement of FIG. 5b is operating in the post take-off mode, the underspeed reference signal 439 that is supplied to the subtractive input of combining unit 440 is not identical to the signal 435 supplied by rate limiter 438. That is, during operation in the post take-off mode, the signal 435 supplied by rate limiter 438 is multiplied (indicated at block 454) by an underspeed feedback reference gain (indicated at block 456), with the output signal provided by multiplier 454 being supplied to the subtractive input terminal of combining unit 440 via switch S1-C. The underspeed feedback reference gain 456 is a function of aircraft speed (e.g., mach) and is established so that the underspeed reference signal 439 is relatively constant (e.g., equal to unity) at relatively low airspeed and decreases at higher airspeed.

The purpose of scheduling underspeed feedback reference gain as a function of airspeed is to partially offset the increased column force characteristics that established at increased speed by the aircraft feel system described relative to FIG. 2a. The specific objective is to achieve a control column force requirement at sticker shaker angle of attack ($\alpha_{SS}$) that is relatively consistent for all flight conditions (desired range of 15–25 pounds) in the currently preferred embodiments of the invention.

As was discussed relative to operation in the take-off mode, the combining unit 440 generates a signal representative of the difference between aircraft filtered airspeed at terminal 442 and the underspeed reference signal 439. The speed difference signal is scaled by $KV_{S3}$ at block 444 to achieve the desired increase in command column force gradient at speeds below the underspeed reference; pitch rate turn compensation damping is effected at combining unit 446; and the resultant signal is limited (by limiter 452) and supplied as a C*U underspeed protection signal that, if not overridden by the pilot, will result in a nose down pitch command signal.

When the underspeed protection arrangement of FIG. 5b is in the post take-off mode of operation, the minimum value C*U reference speed signal, $V_{REF(MIN)}$, is not supplied directly from the output of rate limiter 438. Instead, as is indicated in FIG. 5b, the signal 435 supplied by rate limiter 438 is multiplied (at multiplier 458) by a mach speed trim inhibit gain (indicated at 460), with the product being supplied as the minimum reference speed $V_{REF(MIN)}$ via switch S1-B. like the previously described underspeed feedback reference gain, the mach speed trim inhibit gain is scheduled as a function of aircraft speed; exhibiting a substantially constant gain (e.g., unity) over a low speed range and decreasing for speeds above a predetermined mach value (e.g., Mach 0.6). Thus, the minimum C*U reference speed established by the arrangement of FIG. 5b during post take-off mode operation is approximately equal to the top of the amber band at aircraft speeds below a predetermined mach value and decreases at higher mach values. This relationship is established to supplement the gain variation in underspeed feedback gain to achieve a relatively consistent command column force requirement at $\alpha_{SS}$ for substantially all flight conditions.

5c. Flare Compensation Processor 414

FIG. 5c schematically illustrates the flare compensation arrangement of the currently preferred embodiment of the invention. In the arrangement of FIG. 5c, a signal representative of the altitude of the landing gear above the ground is supplied to terminal 460 connecting to a look-up table 462 or other device that generates a flare command signal 461 (pitch down) that varies (increases) as a function of airplane gear height. Various signals are known in the art for providing an indication of airplane gear height, generally being derived from the aircraft radio altimeter. Preferably, the gear height representative signal is filtered and processed to correct for aircraft pitch attitude.

Look-up table 462 establishes a relationship between the aircraft gear height and the outputted flare command signal that, in effect, emulates ground effects encountered by the aircraft while executing a landing. Emulation of the ground effects by the flare compensation processor enables the C*U system to provide flare handling characteristics similar to those of an unaugmented aircraft.

With continued reference to FIG. 5c. The flare compensation signal 461 supplied by look-up table 462 is supplied to a limiter 467 via a switch 466, which supplies the flare compensation signal to limiter 467 as long as a valid gear altitude signal is being supplied to the flare compensation processor. The lower limit value of limiter 467 is zero (to insure that nose-up compensation signals are not provided by the flare compensation processor), with the upper limit (0.54 g in the current embodiments of the invention) being established equal to the desired flare command at touchdown. The output signal provided by limiter 467 is supplied as the C*U flare compensation signal C*$U_{FL}$ via a switch 468.

Switch 468 is activated to supply a C*U flare compensation signal C*$U_{FL}$ identical to the signal provided by limiter 467 only when the aircraft is operating in the approach mode and reaches a gear height altitude at which the flare maneuver is initiated. In the currently preferred embodiments of the invention, the logic employed for activating switch 468 requires that: (1) the aircraft has been airborne for at least 60 seconds (to prevent flare compensation during take-off); (2) the aircraft flaps are deployed; (3) the gear height signal indicates gear altitude of less than 50 feet for at least one second; and (4) the gear height signal is valid (i.e., is being provided to terminal 460 the depicted flare compensation processor). (Optionally, the gear down switch may be added to the above conditions.) In the event that any one of these conditions are not meant, switch 468 will not activate and, as is indicated at block 470, the C*U flare compensation signal C*$U_{FL}$ is set equal to zero (no compensation). However, once switch 468 activates, it will remain activated if the gear height signal is lost or otherwise becomes invalid. As described below, this allows the flare compensation processor to operate in a manner that does not result in abrupt changes in the flare compensation signal if the gear height signal becomes invalid while a flare compensation is being generated.

Also included in the arrangement of FIG. 5c is a rate limiter 472 which controls the operation of the flare compensation processor if the radio altimeter or other source of the gear height signal fails while the flare compensation processor is providing a compensation signal. In that regard, rate limiter 472 seives as an alternate source of flare compensation signal with the output signal provided by rate limiter 472 being supplied to limiter 467 via switch 466 if a alternate flare compensation engage signal is supplied to the flare compensation processor (indicated at block 474 in FIG. 5c). The alternate flare compensation trigger signal (dashed line 475) can be a signal indicating that the radio altimeter signal is invalid or some other available signal that indicates that the gear height signal is not considered reliable.

During normal operation (i.e., switch 466 in the illustrated position), the C*U flare compensation signal provided by limiter 467 is coupled to rate limiter 472 to establish an initial value or bias level. If an alternate flare compensation system trigger signal 475 activates switch 466, the current value of the signal provided by limiter 472 is established as the input (initial condition) of rate limiter 467. Assuming that the aircraft is not executing a go-around procedure, a signal 476 representative of the flare compensation signal at touchdown. is provided to limiter 472 via a switch 474. Since the output signal of limiter 472 will then increase linearly as a function of time until the maximum limit is reached (0.54 gs in the current embodiment), rate limiter 472 in effect emulates the flare command signal normally provided by look-lip table 462 (operating as a function of time, instead of gear height).

In the event that a go-around was initiated prior to loss of the gear height signal, switch 474 is activated to establish the lower limit of rate limiter 472 at a value of zero (indicated at block 478). Establishing the lower limit of rate limiter 472 at zero during a go-around maneuver means that rate limiter 472 will supply a C*U flare compensation signal that linearly decreases to zero if the gear height signal becomes invalid while a flare compensation signal is being provided.

Those skilled in the art will recognize that a satisfactory C*U flare compensation signal can be generated by arrangements other than the flare compensation processor shown in FIG. 5c. For example, look-up table 462 of FIG. 5c can be replaced with a circuit or other arrangement that is triggered when the airplane reaches an altitude of less than 50 feet and generates a flare command signal that is a function of time (instead of gear altitude). Further, rate limiter 472 can be replaced with other arrangements that smoothly reduce the signal supplied to limiter 467 to the appropriate limit value in the event that the signal normally supplied to limiter 467 is interrupted or otherwise becomes of questionable validity.

5d. Overspeed Protection Processor 412

FIG. 5d illustrates the control law effected by the currently preferred overspeed protection processor (412 in FIG. 5a). The arrangement of FIG. 5d supplies a C*U overspeed protection signal C*$U_{OS}$ that, unless overridden, will result in a nose up pitch command signal whenever the aircraft is being operated at an overspeed condition. As a result of the C*U overspeed signal, the pilot must assert more than normal forward force on the command column to maintain or increase overspeed. In accordance with the invention, the value of the C*U overspeed pitch command signal is established so that the forward command column force required to maintain overspeed sufficiently alerts the pilot to the overspeed condition, but consciously can be overridden if the pilot chooses to do so.

Basically, the arrangement of FIG. 5d determines the existence and extent of overspeed in view of a first overprotection signal 507 that is based upon aircraft calibrated airspeed and a second overspeed protection signal 509 that is based upon mach speed. The two overspeed signals are then compared to determine the greater of the two signals, which is then limited to preclude generation of nose down attitude command signals and to maintain the signal at an appropriate value that is compensated for roll attitude. The limited signal then is provided to summing unit 424 of FIG. 5a as the C*U overspeed protection signal $C^*U_{OS}$.

More specifically, and with reference to FIG. 5d, a signal representative of aircraft filtered airspeed is coupled to an additive terminal of a combining unit 500 via a terminal 502. Connected to the subtractive input of combining unit 500 is a signal representative of an airspeed that is slightly higher than the maximum operating airspeed for the aircraft ($V_{MO}$), indicated at block 501. In the currently preferred embodiments of the invention, the signal supplied to the subtractive input of combining unit 500 representative of 6 knots above $V_{MO}$. The output of combining unit 500, which represents the difference between aircraft filtered airspeed and $V_{MO}$ plus the noted margin, is scaled by a constant gain factor by a scaling unit 504 to control the magnitude of any resultant overspeed signals based upon exceeding $V_{MO}$ relative to the magnitude of overspeed signals representative over exceeding maximum mach speed.

The scaled airspeed difference signal that is provided at block 504 is supplied to an additive terminal of a combining unit 506. Supplied to a second additive input terminal is a signal representative of the aircraft filtered airspeed rate (i.e., time rate of change of filtered airspeed), which is applied to a terminal 508 and scaled by a constant gain factor by a scaling unit 510. The gain factor of scaling unit 510 is set so as to suitably increase the overspeed protection computed airspeed command produced by summing unit 506 when the aircraft is approaching or operating above $V_{MO}$ and, in addition, airspeed is increasing. That is, the gain factor of scaling unit 510 is established in view of the gain factor of scaling unit 504 to control the relative contribution of the signal representing excess airspeed (supplied by combining unit 500) and the signal representative of airspeed rate, which is an acceleration term.

In the arrangement of FIG. 5d, the overspeed protection mach command signal 509 is supplied by a combining unit 512 and is generated in a manner similar to the generation of the overspeed protection computed airspeed command signal 507. Specifically, a signal that represents filtered aircraft macli speed is supplied to all additive terminal of a summing unit 520 (via terminal 514), with the subtractive input terminal of the combining unit 520 receiving a signal representative of the aircraft maximum operating mach speed (MMO) plus a desired margin (e.g., 0.01) (indicated at block 516). The signal supplied by combining unit 520 is scaled (at block 518) and coupled to the additive input terminal of combining unit 512. Coupled to a second additive input of combining unit 512 is a signal representative of mach rate (supplied to terminal 524), which is scaled by an appropriate factor at block 522.

The overspeed protection calibrated airspeed command signal 507 produced by summing unit 506 and the overspeed protection mach command signal 509 supplied by combining unit 512 are compared by a comparator 526 in FIG. 5d. The greater of the two signals is then coupled to a limiter 528. As is indicated at block 530, limiter 528 has a minimum value of zero. The maximum value of limiter 528 is not a constant, however, but is established based upon aircraft roll attitude.

More specifically, a signal representative of aircraft roll attitude (in degrees) is supplied to a terminal 532. The magnitude (absolute value) of the signal is determined at block 534 and the resultant signal is scaled by a scaling unit that exhibits a gain-roll attitude relationship of the type indicated at block 536. Specifically, the gain factor of scaling unit 536 is substantially equal to unity when the absolute value of the aircraft roll attitude is within the range of 0–30° and decreases linearly to 0 over the roll angle range of 30° to 60°. The output of scaling unit 536 is then scaled by a constant (at block 538) that establishes the maximum command column force gradient that can be developed by the depicted overspeed protection processor. That is, the scaling factor employed at block 538 sets an tipper limit on the magnitude of the C*U overspeed protection signal supplied by the depicted arrangement, thus establishing the maximum amount of pitch up attitude command that may be overridden by the pilot if an election is made to fly the aircraft in overspeed condition.

Establishing the lower limit of limiter 528 at zero ensures that the overspeed protection processor will not produce nose down attitude command signals that, unless overcome, would further increase the speed of the aircraft. Scaling the maximum limit value for limiter 528 in the above-described manner reduces the amount of overspeed protection command signal during high-speed banked turns in which the absolute value of the roll attitude is between 30° and 60°. If the aircraft roll attitude reaches or exceeds 60°, the signal supplied by scaling unit 536 becomes zero, in turn establishing the maximum limit value for limiter 528 at zero. Thus, no overspeed protection signal is supplied for high bank angles. During overspeed conditions with the aircraft operating within a typical roll range, the signal supplied by limiter 528 is scaled at block 540 to provide a C*U overspeed protection signal $C^*U_{OS}$ at appropriate levels (e.g., convert a signal supplied by limiter 528 that represents C*U units per pound to a signal that represents C*U units per g).

It can be noted that the above-described C*U overspeed protection system provides increased crew awareness of overspeed by increasing the amount of forward command column force required to maintain the aircraft in overspeed operation.

Moreover, like the previously described protection and compensation processors, the depicted arrangement establishes command column force relationships that allow the pilot to assert command column pressure sufficient to overcome the protection and compensation signals that are provided by the invention. In that regard, and with respect to the currently preferred embodiments of the invention, a maximum force on the order of 40 pounds is required to override overspeed protection at or near aircraft maximum design speed and for airspeed at or near maximum design mach speed.

6. Discussion of Pitch Rate Damping Processor 36

The pitch rate damping processor 36 functions to produce a pitch rate damping command $Q_{COM}$ that, when added to the C*U integral command $IC^*U_{COM}$ will damp the elevator command short period response and adjust the short period frequency. There are two basic features of the preferred pitch rate damping processor 36. The first feature is a shut-off multiplier 631, the second is a combining unit 630 for combining a lagged pitch rate feedback signal 628 and a proportional pitch rate feedback signal 626.

The shut-off multiplier 631 shuts off pitch rate damping augmentation when the airplane is on the ground. The shut-off multiplier 631 multiplies the pitch rate damping command $Q_{COM}$ by a value in the range of 0.0 to 1.0, as supplied by a computing unit 638. The computing unit 638 accepts an on-ground signal from an air/ground status determination processor (not shown). The preferred processor is disclosed in a U.S. patent application Ser. No. 08/441,282, Evans et al., which is entitled System for Providing an Air/Ground Signal to Aircraft Flight Control Systems, filed May 15, 1995, and incorporated herein by reference. Starting from an on-ground state and transitioning to an in-air state, the on-ground signal will switch from false to true. This causes the computing unit 638 to switch from outputting a value equal to zero, to a value equal to one. The preferred computing unit 638, however, ramps the output value over a relatively short period of time (nominally less than 10 seconds) instead of stepping it. The reverse situation causes the computing unit 638 to switch from outputting a signal equal to one, to a signal equal to zero, in a ramped fashion. By ramping the output value, the pitch rate damping command $Q_{COM}$ is gradually reduced. This makes the transition from an augmented to an unaugmented system a smooth, unnoticeable change.

The lagged pitch rate feedback signal 628 and proportional pitch rate feedback signal 626 are the additive inputs to the combining unit 630. The output signal of combining unit 630 corresponds to the pitch rate damping command $Q_{COM}$ before multiplication by the shut-off multiplier 631 described above. The two signals 626, 628 are combined to generate the pitch rate damping command $Q_{COM}$.

The lagged pitch rate feedback signal 628 is supplied by a lag filter 618 having a transfer function of the form $K_{q1}/(\tau s+1)$, where $K_{q1}$ and $\tau$ are provided according to a schedule indicated at block 614. The input to filter 618 is the turn compensated pitch rate signal q, or $\dot{\theta}_{EST}$, from FIG. 4d. The values of $K_{q1}$ and $\tau$ preferably depend on flap position, or airspeed, where flaps-up establishes $K_{q1}$ equal to 1.0 and $\tau$ equal to 1.5, and flaps-down establishes $K_{q1}$ equal to 1.5 and $\tau$ equal to 1.0. This transition between flaps down and flaps up values is done gradually over a predetermined period of time (nominally 10 to 30 seconds). The lag filter 618 establishes functions to provide a lagged pitch rate feedback signal 628 based on the turn compensated pitch rate signal q that can be used as a feedback to adjust the short period frequency.

The proportional pitch rate feedback signal 626 is supplied by a shaping filter 624. The shaping filter 624 has a transfer finction that removes frequency content of the pitch rate signal that could interfere with the airplane natural modes. The input to the shaping filter 624 is the turn compensated pitch rate signal q (or $\dot{\theta}_{EST}$) as modified by a gain 620 having a gain damping factor $K_q$, provided as shown at block 619. As indicated in FIG. 6, the term $K_q$ is preferably dependent on flap position, where flaps-up establishes $K_q$ equal to 1.0 and flaps-downi establishes $K_q$ equal to 1.35. The gain damping factor $K_q$ provides adequate short period damping for high speed and low speed operations as dictated by flap setting. Again, the transition between flaps up and flaps down gain values is relatively gradual.

In the preferred embodiment, the flap setting is used to determine $K_{q1}$ and $K_q$, the flap down status being first confirmed by airspeed data. The use of flap setting to determine $K_{q1}$ and $K_q$ precludes gain changes based on erroneous airdata as might be the case during an ash cloud encounter, while using airspeed precludes increasing the gain if the flap data is erroneous. Trigger mechanisms other than flap position may be used to set $K_{q1}$ and $K_q$, depending on the available data and the designer's preference (e.g., other combinations of logic using both. flap position and/or airspeed).

Basically, the turn compensated pitch rate signal q is supplied to the pitch rate damping processor 36 and is multiplied by a gain damping factor $K_q$ that is dependent on flap setting. The resulting signal is shaped by a shaping filter 624 and added to a lagged pitch rate feedback signal 628, which is supplied by the lag filter 618 which is connected for receiving the turn compensated pitch rate signal q.

It may be noted that the pitch rate damping processor 36 may be based on a pitch attitude signal θ instead of, or in conjunction with, the turn compensated pitch rate signal q. Such a change would require an appropriate revision of gains 620 and 618 and filter 624. The preferred input is the turn compensated earth referenced pitch rate signal q as discussed in section 4 above and shown in FIG. 4b.

7. C*U Integrator 28

The C*U integrator 28 integrates the error signal $E_{C*U}$ to continually add a portion of the error signal $E_{C*U}$ to the elevator pitch command $\delta_{e,FILT}$. Eventually, the C*U integrator 28 will wash out the error signal $E_{C*U}$ since the elevator pitch command $\delta_{e,FILT}$ causes the elevator to move, which causes the inputs to the computed C*U signal $C*U_{computed}$ to change, causing the difference between the pilot-requested C*U command $C*U_{PilotCmd}$ and the sum of the computed C*U signal $C*U_{computed}$ with the compensation and protection C*U signal $C*U_{C\&P}$ to go to zero.

There are six features in the preferred form of the C*U integrator 28: a gain $K_i$, a shut-off multiplier 642, a windup-preventor 648, a wash-out gain 666, a combining unit 654 and an integrator 662. Each of these features provides a desirable modification to the pitch-axis stability and command system, although, the only essential feature is the integrator 662. The basic structure of the C*U integrator 28 is such that the error signal $E_{C*U}$ and the trim negation signal TNS are the additive inputs to combining unit 654, with the output of the combining unit 654 being supplied to the integrator 662. The resulting signal is the integral C*U command $IC*U_{COM}$ discussed in section 1. Before the error signal $E_{C*U}$ is input to combining unit 654, a number of different conditions may exist that may cause another value to enter the combining unit 654 instead of the error signal $E_{C*U}$. These conditions are discussed below.

Figure 7:
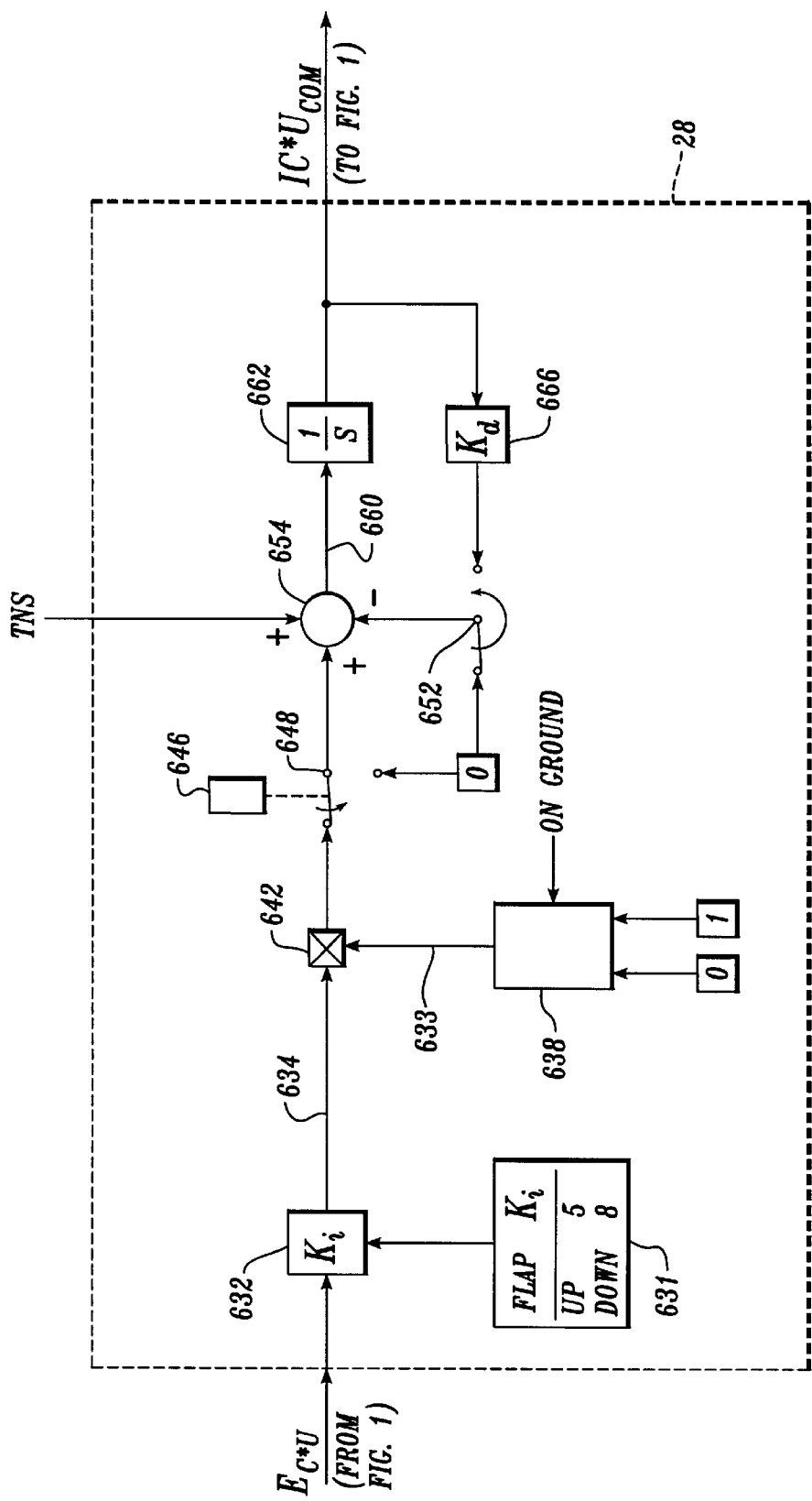
FIG. 7 is a control diagram of a C*U integrator of FIG. 1.

The error signal $E_{C*U}$ is scaled at gain 632 by an integral gain factor $K_i$ according to the schedule shown in block 631. The scaling of the error signal $E_{C*U}$ by $K_i$ provides desirable short period response for high speed and low speed conditions (as indicated by flap position, shown in block 631). Block 631 sets $K_i=5$ for flaps-up and $K_i=8$ for flaps-down with the transition between the flap down and flap up values being gradual. Other means, such as air data, may be used to determine high speed or low speed conditions, if desired. The error signal $E_{C*U}$ as modified by the gain $K_i$ at 632 is shown in FIG. 7 as signal 634.

The second feature of the C*U integrator 28 is the shut-off multiplier 642 (or gain reducer) that shuts off C*U augmentation when the airplane is on the ground. The shut-off multiplier 642 multiplies the output of the gain 632 by a value in a range between 0.0 and 1.0, as supplied by a computing unit 638. The computing unit 638 basically switches the value used by the multiplier 642 between 0.0 and 1.0 in a ramped fashion. The computing unit 638 is described above in section 6. By ramping the outputted value, C*U augmentation is gradually reduced. This makes the transition from an augmented to an unaugmented system a smooth, unnoticeable change.

The third feature of the C*U integrator 28 is the windup-preventor logic 646 that prevents the integrator from adding elevator pitch command $\delta_{e,FILT}$ augmentation when the elevators (or airplane) are not able, or required, to respond. A switch 648 is provided in the C*U integrator 28 that in its normal closed position does not disturb the output of multiplier 642. The switch is normally closed unless a specific set of criteria are met. The logic for determining when the switch 648 opens is shown in FIG. 7 as being supplied by unit 646. The preferred logic of unit 646 opens the switch when any one of the following conditions is met: (1) the airplane is on ground, (2) the airplane tail is near the ground and the error signal $E_{C*U}$ is requesting more nose-up, (3) the airplane is at a high angle of attack and the error signal $E_{C*U}$ is requesting more nose-up, or (4) the elevator has reached its maximum limit of authority and error signal $E_{C*U}$ is requesting further elevator movement in the limited direction. Under any of these conditions, it is not desirable to allow the integrator to operate, since requesting further pitch does not produce, or should not be allowed to produce, a further change in pitch attitude. Opening the switch 648 results in a value of 0.0 being sent to the additive input of combining unit 654, instead of the output of multiplier 642.

The fourth feature is the combining unit 654 for combining the additive inputs of error signal $E_{C*U}$ (or zero if switch 648 is open) and trim negation signal TNS discussed in section 1 above and shown in FIG. 1. The preferred trim negation signal is derived from the rate of change of stabilizer position as converted to degrees of elevator per second and is described in a U.S. patent application, Ser. No. 08/441,682, by E. E. Coleman et al., which is entitled Method and Apparatus for Automatically Training an Airplane Stabilizer, filed May 15, 1995, and incorporated herein by reference. The generation of a trim negation signal is included in the operation of currently available autopilot systems. Adding the trim negation signal TNS to the output of the multiplier 642, during the off-load operation, moves the elevator toward its faired position with respect to the stabilizer, without generating a noticeable airplane response.

The fifth feature of C*U integrator 28 is provision of wash-out function 666 that includes a decay gain $K_d$ and that causes the output of integrator 662 gradually to decay to zero over a predefined period. The decay gain 666 gradually eliminates augmentation when the airplane is on the ground. This is a desirable feature, because the integral C*U command signal $IC*U_{COM}$ should be set to zero before the next flight. It is preferable to accomplish this decay in a short period of time and after a short time delay after airplane touch-down. In FIG. 7, the gain unit 666 is supplied with integral C*U command $IC*U_{COM}$ signal and multiplies it by the decay gain $K_d$. A switch 652 located in the output signal path of the wash-out gain unit 666 opens when the airplane is on ground to supply the output of the wash-out gain 666 to the combining unit 654. The preferred decay gain $K_d$ is less than one.

The sixth feature is the integrator 662. The integrator 662 computes a portion of the error signal $E_{C*U}$ and supplies the integral C*U command $IC*U_{COM}$ which is used as discussed in section 1. In summary, the error signal $E_{C*U}$ supplied to the C*U integrator 28, is modified by an integral gain K then combined with the trim negation signal TNS; and, integrated to generate the C*U integral command $IC*U_{COM}$.

While the preferred embodiment of the invention has been illustrated and described, it will be appreciated that various changes can be made therein without departing from the spirit and scope of the invention. This C*U control law is novel and is developed for statically relaxed airplanes. It is to be understood, however, that other non-statically relaxed airplanes, may benefit from the present invention as well.

The embodiments of the invention in which an exclusive property or privilege is claimed are defined as follows:

1. An aircraft pitch control system for use with an aircraft having a movable control column, the aircraft further including a position sensor for generating a signal representative of the control column position, the system comprising:

(a) a first signal combiner having first and second inputs and an output;

(b) a pitch command processor connected for receiving the column position signal and for supplying a feedforward elevator command signal to the first input of the first signal combiner;

(c) a commanded elevator response processor connected for receiving an input including the signal representative of the control column position and for generating an output including a signal representative of the commanded elevator response, the commanded elevator response signal embodying desired flight characteristics;

(d) a computed elevator response processor for receiving inputs including signals representative of the aircraft normal acceleration, aircraft pitch rate, aircraft speed, and a reference speed; the computed elevator response processor generating an output signal representative of a computed elevator response according to current flight conditions; the computed elevator response being based upon at least the aircraft normal acceleration signal, the aircraft pitch rate signal, the aircraft speed signal, and the reference speed signal;

(e) a second signal combiner connected for receiving the computed elevator response signal and the commanded elevator response signal and for generating an output signal representative of the difference between the computed elevator signal and the commanded elevator signal; and (f) an integrator connected for receiving the difference signal and for driving the difference signal to about zero, the integrator generating an output signal received by the second input to the first signal combiner;

wherein the pitch command processor includes bias correction means connected for receiving the control column position signal and for supplying a corrected column position signal to the commanded elevator response processor as the signal representative of the position of the control column, the bias correction means for reducing bias in the control column position signal when the control column is in a neutral position.

2. The aircraft pitch control system according to claim 1, wherein the bias correction means comprise a limiter unit for limiting the correction signal to a value within a predefined range, the range being representative of control column position signal values of interest.

3. The aircraft pitch control system according to claim 1, wherein the bias correction means comprise:

(a) a first combining unit for combining the control column position signal and a signal representative of the required correction;

(b) a switch having activated and deactivated states, the switch being set to the deactivated state when the movable control column is physically displaced from a neutral position, the activated state setting the correction signal to approximately the same value as the control column position signal.

4. The aircraft pitch control system according to claim 3, wherein the bias correction means further comprise a smoothing filter for receiving the control column position signal and outputting a smoothed correction signal when the switch is in its activated state.

5. The bias correction system according to claim 1, wherein the bias correction means reduce bias in the control column position signal when the control column is moved away from its neutral position by an amount approximately equal to the value of the control column position signal during the neutral position.

6. The bias correction system according to claim 3, wherein the deactivated state allows the correction signal to remain at its last value, the last value being representative of the bias of the control column in the neutral position; and wherein the switch is set to the activated state when the control column is in its neutral position, thereby causing the corrected column position signal to equal approximately zero.

7. A bias correction system for use in an aircraft having a control column and a pitch control system, the position of the control column being represented by a control column position signal, the bias correction system for removing any control column bias when the control column is in a neutral position, the bias correction system comprising:

(a) a first combining unit for combining the control column position signal and a correction signal, and for providing as an output a corrected column position signal;

(b) a switch having activated and deactivated states, the switch being set to the deactivated state when the control column is physically displaced from its neutral position, the deactivated state allowing the correction signal to remain at its last value, the last value being representative of the bias of the control column; the switch being set to the activated state when the control column is in its neutral position, the activated state allowing the correction signal to equal approximately the control column position signal and the corrected column position signal to equal approximately zero.

8. The bias correction system according to claim 7, further comprising a smoothing filter for receiving the control column position signal and outputting a smoothed correction signal when the switch is in the activated state.

9. The bias correction system according to claim 8, further comprising a limiting unit for limiting the correction signal within a predefined range of the control column position signal.

* * * * *

UNITED STATES PATENT AND TRADEMARK OFFICE
CERTIFICATE OF CORRECTION

PATENT NO. : 6,325,333 B1
DATED : December 4, 2001
INVENTOR(S) : K. Najmabadi et al.

It is certified that error appears in the above-identified patent and that said Letters Patent is hereby corrected as shown below:

<u>Title page, Item [54], and Column 1, lines 1-2,</u>
Title, "AIRCRAFT PITCH-AXIS STABILITY AND COMMAND AUGMENTATION SYSTEM" should read -- AIRCRAFT PITCH-AXIS CONTROL SYSTEM WITH BIAS CORRECTION FOR REDUCING BIAS IN A COLUMN POSITION SIGNAL --

Signed and Sealed this

Fourteenth Day of May, 2002

*Attest:*

JAMES E. ROGAN
*Attesting Officer*     *Director of the United States Patent and Trademark Office*